United States Patent
Zhu et al.

(10) Patent No.: US 10,361,504 B2
(45) Date of Patent: Jul. 23, 2019

(54) ELECTRICAL POWER TRANSMISSION AND OUTLET SYSTEM

(71) Applicant: SHANUTEC (SHANGHAI) CO., LTD., Shanghai (CN)

(72) Inventors: Wenting Zhu, Shanghai (CN); Enhua Geng, Shanghai (CN); Guoxin Wu, Shanghai (CN); Nan Luo, Shanghai (CN); Quangang Zhang, Shanghai (CN); Yan Chen, Shanghai (CN); Bowei Lu, Shanghai (CN)

(73) Assignee: SHANUTEC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/735,615

(22) PCT Filed: Jun. 7, 2016

(86) PCT No.: PCT/CN2016/085173
§ 371 (c)(1),
(2) Date: Dec. 12, 2017

(87) PCT Pub. No.: WO2016/197926
PCT Pub. Date: Dec. 15, 2016

(65) Prior Publication Data
US 2018/0316121 A1    Nov. 1, 2018

(30) Foreign Application Priority Data

Jun. 12, 2015  (CN) .......................... 2015 1 0325621
Jul. 28, 2015  (CN) .......................... 2015 1 0451697
(Continued)

(51) Int. Cl.
*H01R 13/44*  (2006.01)
*H01R 13/52*  (2006.01)
(Continued)

(52) U.S. Cl.
CPC ..... *H01R 13/5213* (2013.01); *H01R 13/4532* (2013.01); *H01R 13/5227* (2013.01);
(Continued)

(58) Field of Classification Search
CPC ............ H01R 13/5213; H01R 13/6205; H01R 13/5227; H01R 13/4532; H01R 25/006; H02J 3/383; H02H 3/18
(Continued)

(56) References Cited

U.S. PATENT DOCUMENTS 3,569,899 A   3/1971  Laser
4,078,848 A   3/1978  Blairsdale
(Continued)

FOREIGN PATENT DOCUMENTS

CN   2187847 Y   1/1995
CN   2205066 Y   8/1995
(Continued)

OTHER PUBLICATIONS

First office action for Chinese application No. 201510325621.1 dated Jun. 8, 2016, 10 pages.
(Continued)

*Primary Examiner* — Jean F Duverne
(74) *Attorney, Agent, or Firm* — Metis IP LLC

(57) ABSTRACT

An electrical power transmission and outlet system. The electrical power transmission and outlet system may include an electrical power transmission and outlet device and an external power storage unit (1110). The electrical power transmission and outlet device may include a housing (1060) having an opening for receiving an external plug (1220), a connector (1070) in the housing (1060) for connecting with the external power storage unit (1110); and a plurality of electrical conductors in the housing (1060) connected to the connector (1070). When the external plug (1220) is inserted
(Continued)

into the opening, the conductors are electrically connected to the external plug (1220) and disconnected from the connector (1070), and when the external plug (1220) is pulled out of the opening, the conductors are electrically disconnected from the external plug (1220) and reconnected to the connector (1070).

18 Claims, 36 Drawing Sheets

(30) Foreign Application Priority Data

Jul. 28, 2015 (CN) .......................... 2015 1 0452096
Sep. 15, 2015 (CN) .......................... 2015 1 0586576

(51) Int. Cl.
| | | |
|---|---|---|
| *H01R 25/14* | (2006.01) | |
| *H01R 13/453* | (2006.01) | |
| *H01R 25/00* | (2006.01) | |
| H01R 103/00 | (2006.01) | |
| H01R 24/70 | (2011.01) | |
| H01R 13/193 | (2006.01) | |
| H02J 3/38 | (2006.01) | |

(52) U.S. Cl.
CPC ........... *H01R 25/006* (2013.01); *H01R 25/14* (2013.01); *H01R 13/193* (2013.01); *H01R 24/70* (2013.01); *H01R 25/145* (2013.01); *H01R 2103/00* (2013.01); *H02J 3/383* (2013.01); *H02J 3/386* (2013.01)

(58) Field of Classification Search
USPC ....................................................... 439/138
See application file for complete search history.

(56) References Cited

U.S. PATENT DOCUMENTS

| | | | |
|---|---|---|---|
| 4,493,516 | A | 1/1985 | Attema |
| 6,881,082 | B2 | 4/2005 | Jordan et al. |
| 7,374,444 | B1 | 5/2008 | Bennett |
| 9,716,357 | B2 | 7/2017 | Zhu |
| 2009/0047838 | A1 | 2/2009 | Jong |
| 2009/0298325 | A1 | 12/2009 | Jonker et al. |
| 2014/0226315 | A1* | 8/2014 | Nicieja .............. H01R 13/6205 362/127 |
| 2016/0072266 | A1* | 3/2016 | Bulancea ............... H02G 3/088 174/67 |
| 2016/0294132 | A1 | 10/2016 | Zhu |
| 2018/0159283 | A1* | 6/2018 | Garcia .................... H02G 3/18 |
| 2018/0212352 | A1 | 7/2018 | Zhu et al. |

FOREIGN PATENT DOCUMENTS

| | | |
|---|---|---|
| CN | 101677698 A | 3/2010 |
| CN | 201732942 U | 2/2011 |
| CN | 201829770 U | 5/2011 |
| CN | 202058940 U | 11/2011 |
| CN | 203013961 U | 6/2013 |
| CN | 203014120 U | 6/2013 |
| CN | 203014121 U | 6/2013 |
| CN | 203839636 U | 9/2014 |
| CN | 203839636 U | 9/2014 |
| CN | 203883277 U | 10/2014 |
| CN | 204257874 U | 4/2015 |
| CN | 104882753 A | 9/2015 |
| CN | 104934801 A | 9/2015 |
| CN | 204315861 U | 9/2015 |
| CN | 104993296 A | 10/2015 |
| CN | 104993340 A | 10/2015 |
| CN | 105006715 A | 10/2015 |
| CN | 204696394 U | 10/2015 |
| CN | 204720727 U | 10/2015 |
| CN | 204720727 U | 10/2015 |
| CN | 204809577 U | 11/2015 |
| CN | 204809577 U | 11/2015 |
| CN | 204858106 U | 12/2015 |
| CN | 204858106 U | 12/2015 |
| CN | 204858195 U | 12/2015 |
| CN | 204992207 U | 1/2016 |
| CN | 201946773 U | 12/2017 |
| GB | 1504119 A | 3/1978 |
| WO | 2008132593 A2 | 11/2008 |
| WO | 2016197926 A1 | 12/2016 |

OTHER PUBLICATIONS

First office action for Chinese application No. 201510451697.9 dated Jul. 5, 2016, 12 pages.
Second office action for Chinese application No. 201510451697.9 dated Jan. 5, 2017, 16 pages.
First office action for Chinese application No. 201510451656.X dated Jan. 24, 2017, 19 pages.
Second office action for Chinese application No. 201510451656.X dated Sep. 18, 2017, 22 pages.
First office action for Chinese application No. 201510452096.X dated Nov. 14, 2016, 17 pages.
First office action for Chinese application No. 201510586576.5 dated Feb. 17, 2017, 14 pages.
European Search Report in European Application No. 16806824.5 dated Mar. 14, 2018, 13 pages.
Extended European Search Report in European Application No. 16806824.5 dated May 11, 2018, 14 pages.
International Search Report in PCT/CN2016/085173 dated Sep. 14, 2016, 5 pages.
Written Opinion in PCT/CN2016/085173 dated Sep. 14, 2016, 5 pages.

* cited by examiner

ELECTRICAL POWER TRANSMISSION AND OUTLET SYSTEM

CROSS-REFERENCE TO RELATED APPLICATIONS

This application is a U.S. national stage of international Application No. PCT/CN2016/085173, filed on Jun. 7, 2016, which claims priority to Chinese Application No. 201510325621.1, filed on Jun. 12, 2015, Chinese Application No. 201510586576.5, filed on Sep. 15, 2015, Chinese Application No. 201510452096.X, filed on Jul. 28, 2015, Chinese Application No. 201510451656.X, filed on Jul. 28, 2015 and Chinese Application No. 201510451697.9, filed on Jul. 28, 2015, each of which is incorporated herein by reference in its entirety.

TECHNICAL FIELD

The present disclosure relates to an electrical power transmission and outlet system.

BACKGROUND

Conventional electrical power outlets or outlet strips generally have fixed locations. In order to connect to a device or an appliance that is located far away, an extension cord or extension socket is normally used. However, when the number of devices or appliances increases, the additional cords and/or extension sockets not only make a room look untidy but also cause safety issues. Alternatively, more sockets may be installed on the walls to meet the increased number of appliances and/or devices. However, more sockets require more complexed wiring inside the walls. Also, it is difficult to predict how many outlets are needed and where to install them in a house because different people may have different demand.

SUMMARY

According to one aspect of the present disclosure, provided herein is an electrical power transmission and outlet device and system. Various electronic devices and/or appliances may plug into the electrical power transmission and outlet device to receive electricity from a plurality of locations in a room. In some embodiments, an electrical power transmission and outlet system which includes an electrical power transmission and outlet device and an external power storage unit is provided.

In some embodiments, the electrical power transmission and outlet device includes a housing, a plurality of concave slots formed inside the housing, and a plurality of electrical conductors placed in at least some concave slots.

In some embodiments, the housing includes an opening that when an external plug is inserted into the opening, the conductors in the slots are electrically connected to the external plug.

In some embodiments, the electrical power transmission and outlet device further includes a plurality of elastic embossments installed inside the housing and opposite to the conductors.

In some embodiments, the electrical power transmission and outlet device further includes a cover for the opening.

In some embodiments, the cover is waterproof and dustproof.

In some embodiments, the cover is made of an elastic material which bends downwards when the external plug is inserted into the opening and restores when the external plug is pulled out.

In some embodiments, the cover includes a rotation shaft which rotates downwards when the external plug is inserted into the opening and restores when the external plug is pulled out.

In some embodiments, the electrical power transmission and outlet device further includes a drainage unit.

In some embodiments, the drainage unit is a guiding gutter.

In some embodiments, a side of the housing is configured to be mounted to a surface.

In some embodiments, the surface is a wall, a ceiling, a floor or a table.

In some embodiments, the electrical power transmission and outlet device includes a housing having an opening for receiving an external plug, a connector in the housing for connecting with an external device, and a plurality of electrical conductors in the housing connected to the connector.

In some embodiments, when an external plug is inserted into the opening, the conductors are electrically connected to the external plug and disconnected from the connector, and when the external plug is pulled out of the opening, the conductors are electrically disconnected from the external plug and reconnected to the connector.

In some embodiments, the electrical power transmission and outlet device further includes an elastic component installed inside the housing.

In some embodiments, when the external plug is inserted into the opening, the connector is displaced from an original position and when the external plug is pulled out of the opening, the elastic component moves the connector back to the original position.

In some embodiments, the elastic component is a spring.

In some embodiments, the external plug can be inserted at a plurality of locations of the opening.

In some embodiments, the connector includes a plurality of electric wires.

In some embodiments, the electrical conductors are electrically connected to a ground wire, a hot wire, and a neutral wire, respectively.

In some embodiments, the external power storage unit is a battery, a power source, a capacitor, or a power adaptor.

In some embodiments, the external power storage unit is connected to a power generator.

In some embodiments, the power generator is a solar panel or a wind turbine.

In some embodiments, the external power storage unit supplies electricity to the electrical conductors when the external plug is pulled out of the opening.

In some embodiments, the external power storage unit is placed inside the housing.

DETAILED DESCRIPTION

Figure 1A:
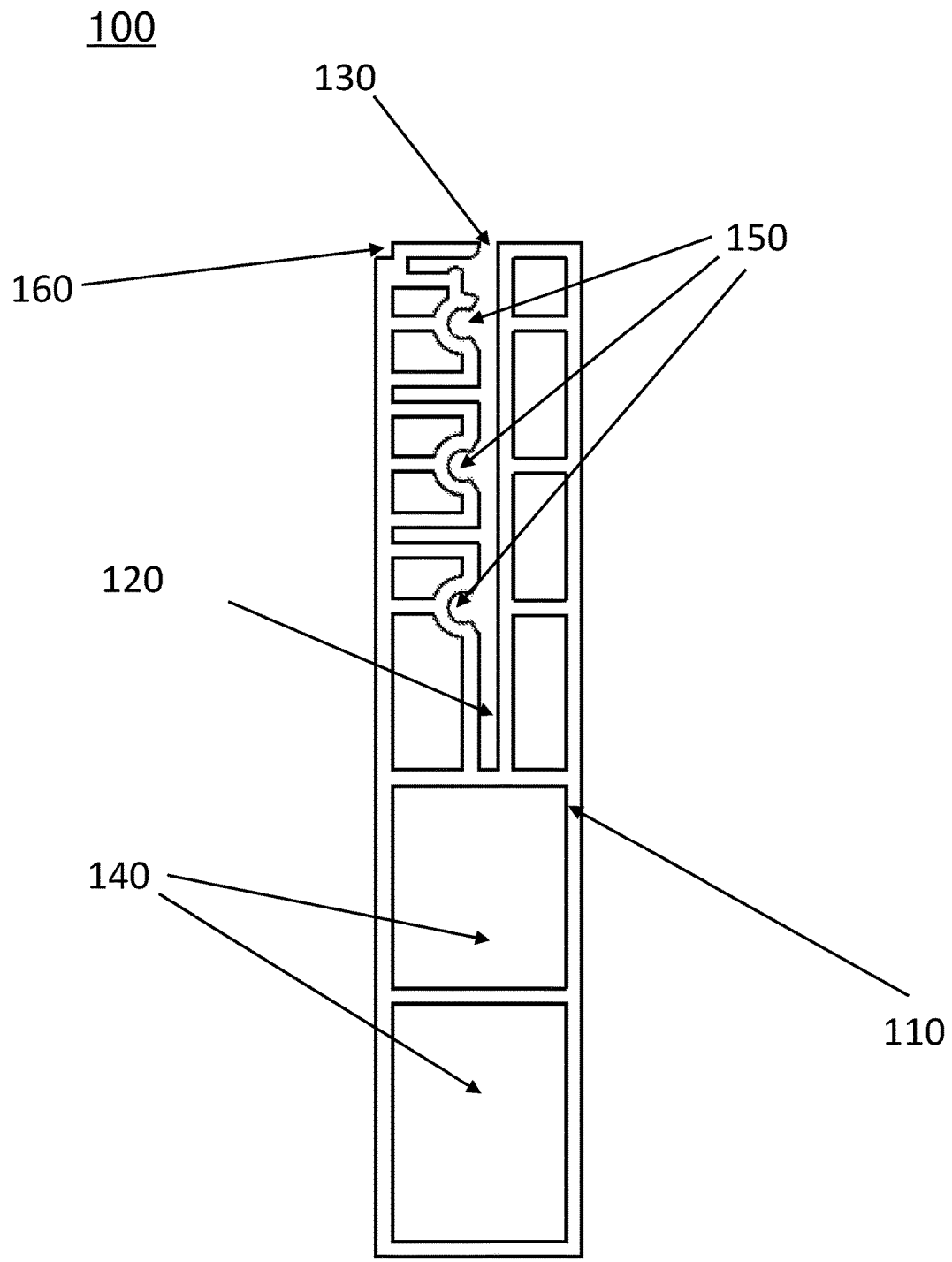
FIG. 1A illustrates a cross-sectional view of an exemplary electrical power transmission and outlet device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. As used in the specification and in the claims, the singular forms of "a", "an", and "the" include plural references unless the context clearly dictates otherwise.

After reading this description, it will become apparent to one skilled in the art how to implement the disclosure in various alternative embodiments and alternative applications. However, not all embodiments of the present disclosure are specifically described herein. It will be understood that the embodiments are presented by way of example only, and not limitation. As such, this detailed description of various alternative embodiments should not be construed to limit the scope or breadth of the present invention as set forth below.

FIG. 1A illustrates a cross-sectional view of an exemplary electrical power transmission and outlet device according to some embodiments of the present disclosure. As shown in FIG. 1A, the electrical power transmission and outlet device 100 may include a housing 110, an insertion groove 120, a plurality of chambers 140, and a plurality of concave slots 150. The insertion groove 120 has an opening 130 for receiving an external plug (not shown in the figure). In some embodiments, the opening 130 is positioned on the top side of the housing 100.

In some embodiments, the housing 110 is mounted on a surface, such as a wall, a ceiling, a floor, a table, a corner, or a window. The housing 110 and the surface are connected such that there is enough space for inserting an external plug into the opening 130 or removing it from there.

The plurality of chambers 140 may be formed inside the housing 110 and have the same or different shapes or sizes. They may channel and store wires (e.g., electricity transmission wires, data transmission wires) and/or hold a power storage unit. Wires with different length and width may be stored in different chambers. In some embodiments, wires carrying different voltages may be stored in different chambers. Such wires may include a hot wire, a neutral wire, and optionally a ground wire.

In some embodiments, the plurality of concave slots 150 may be formed on an inside wall of the housing. For example, they may be formed on one side wall of the insertion groove 130 or on both side walls of the insertion groove 130. These concave slots 150 may have a plurality of sizes or shapes (e.g., triangular, rectangular). For example, as shown in FIG. 1A, the electrical power transmission and outlet device 100 has three identical concave slots 150 formed on the same side wall of the insertion groove 120.

In some embodiments, a plurality of electrical conductors may be placed in at least some of the concave slots. For example, the three concave slots 150 shown in FIG. 1A may each hold an electrical conductor. These conductors are further connected to a hot wire, a neutral wire, and a ground wire, respectively, and the wires may be stored in the plurality of chambers 140. When an external plug is inserted into the insertion groove 120, the conductors in the slots are electrically connected to the external plug, allowing a device or appliance connected to the external plug to receive electricity from the electrical power transmission and outlet device 100. The electrical conductors may include sections made of conducting materials. Also, certain sections of these conductors may be made of rigid materials. These electrical conductors may be electrically connected to the electricity transmission wires or data transmission wires.

In some embodiments, the electrical power transmission and outlet device 100 may further include a sealing structure. The sealing structure may be placed in the housing to prevent people, in particular children, from putting their fingers or any conducting object into the opening 130. Furthermore, the sealing structure may prevent water or moisture from leaking into the electrical power transmission and outlet device 100 from the opening 130. The sealing structure may be placed at the inner side of the opening 130. The sealing structure opens when an external plug is inserted into the insertion groove 120 and closes when the external plug is pulled out of the insertion groove 120.

In some embodiments, the electrical power transmission and outlet device 100 may further include a drainage unit. The unit may help to remove water from the device 100 during an accidental water splash or the like. In some embodiments, the unit may include a guiding gutter 160 formed on at least one of the outer edges of the electrical power transmission and outlet device 100 to collect water. The guiding gutter 160 may further include a part to dispose collected water. In some embodiments, the device may be installed such that the guiding gutter 160 is next to a wall. Merely by way of example, the left side of the device 100 in FIG. 1A is attached to a wall on the left so that the guiding gutter 160 collects and drains water flowing down from the wall.

Figure 1B:
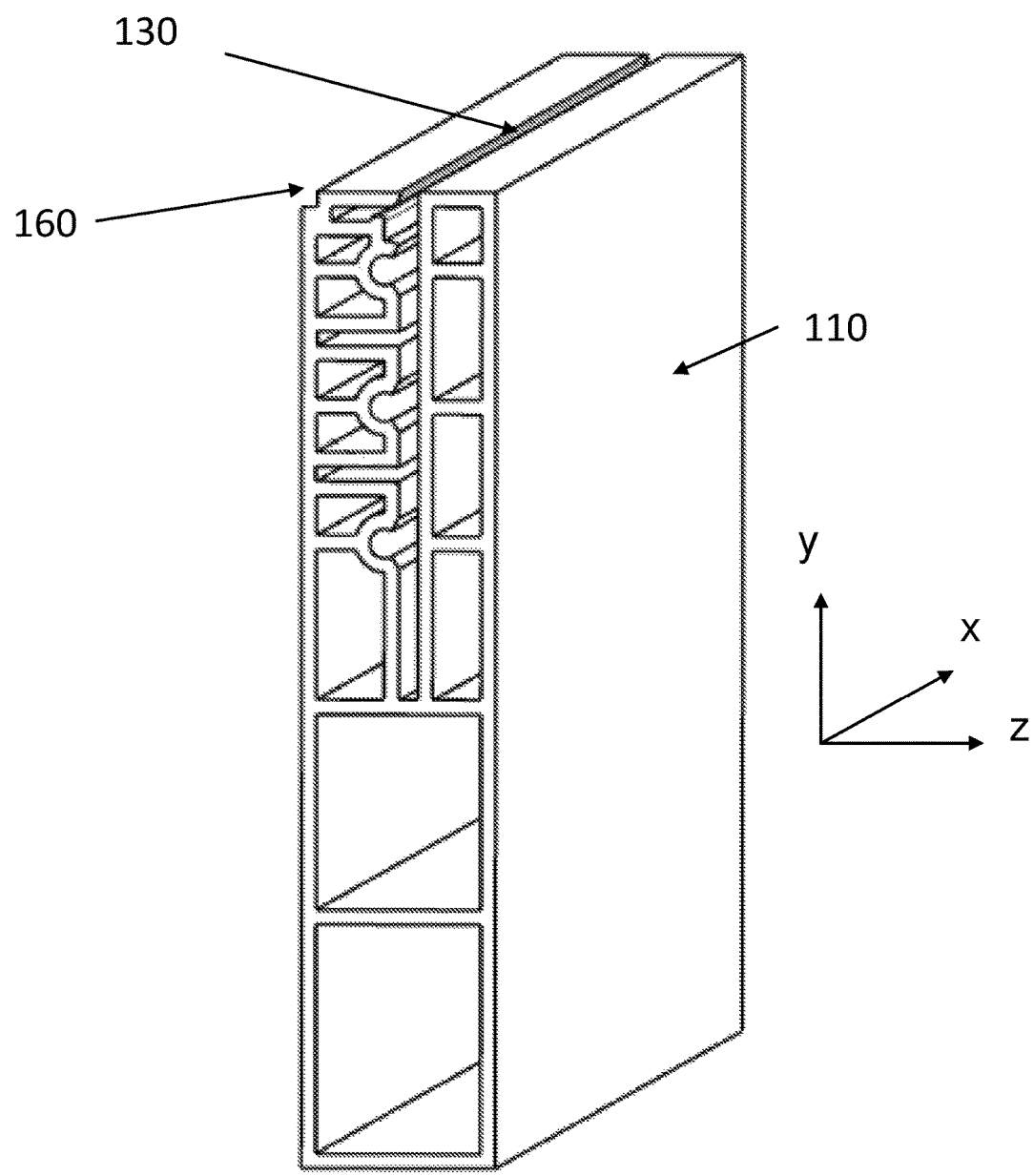
FIG. 1B illustrates a perspective view of an exemplary electrical power transmission and outlet device according to some embodiments of the present disclosure.

FIG. 1B illustrates a perspective view of an exemplary electrical power transmission and outlet device according to some embodiments of the present disclosure. FIG. 1B may illustrate the same elements as explained with reference to FIG. 1A. As shown in FIG. 1B, the housing 110 may extend in the x-direction (also referred to as length), the insertion groove may align with the y-direction (also referred to as height) and the z-direction may be the thickness direction (also referred to as width) of the housing 110. In some embodiments, the width of the housing 110 is several times shorter than its height and its length.

In some embodiments, the electrical power transmission and outlet device 100 may maintain the same inner structure along the length direction. For example, all the sections or structures in the electrical power transmission and outlet device 100 are continuous in nature in the length direction. The length of the insertion groove 120 and the length of the opening 130 in the length direction may be the same as the length of the housing 110. The width (or thickness) and height of an external plug may be the same as or similar to the corresponding width and height of insertion groove 120 while the length of the external plug may be several times shorter than the length of the insertion groove 120. In some embodiments, the opening 130 and the insertion groove 120 may be discontinuous in the length direction. For example, the electrical power transmission and outlet device 100 may have a plurality of insertion grooves 120 and corresponding openings 130 with solid structures between any two adjacent insertion grooves and openings.

As described above, the conductors in the concave slots are electrically connected to an external plug when the external plug is inserted into the insertion groove 120. In addition, the external plug may slide within the insertion groove 120 along the length direction while still maintaining the electrical connection with the conductors.

Figure 2:
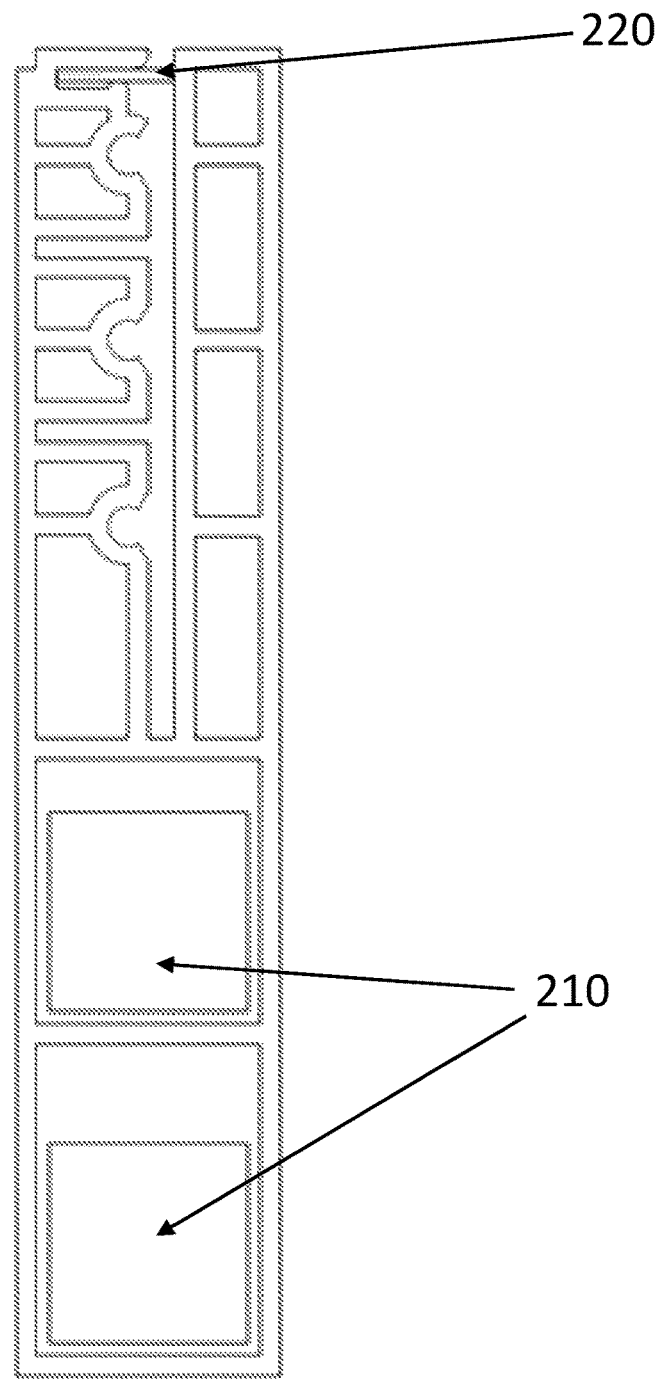
FIG. 2 illustrates a cross-sectional view of an exemplary electrical power transmission and outlet device connected to a plurality of power storage units according to some embodiments of the present disclosure.

FIG. 2 illustrates a cross-sectional view of an exemplary electrical power transmission and outlet device connected to a plurality of power storage units according to some embodiments of the present disclosure. Similar to the embodiment shown in FIG. 1A, the electrical power transmission and outlet device 200 may include a housing, an insertion groove, a plurality of chambers, a plurality of concave slots and a plurality of conductors. Similarly, the insertion groove has an opening formed on the top side of the housing for receiving an external plug, and the plurality of conductors are placed in at least some concave slots. As shown in FIG. 2, the device 200 further includes a plurality of power storage units 210 and a sealing structure 220. The power storage units 210 are stored in the plurality of chambers. In some embodiments, the conductors held in the concave slots are connected to a power source such as a power grid through electricity transmission wires, e.g. a ground wire, a hot wire, and a neutral wire. When the external plug is inserted into the housing, it is electrically connected to the conductors to receive electrical power from said power grid through the wires. In some embodiments, the power storage units 210 may supply electricity to the plug in a situation where the power grid has lost power or is not available due to, for example, a power outage. Alternatively, the power storage units 210 and the power grid may supply electrical power concurrently to the plug.

In some embodiments, a sealing structure 220 may be installed to prevent water or moisture from leaking into the electrical power transmission and outlet device. As shown in FIG. 2, the sealing structure may include a cover for the opening of the insertion groove. For example, the sealing structure 220 includes a rigid cover that is removably attached to a side wall of the insertion groove near the opening. The rigid cover seals the opening of the device 200 and is completely removed from the device 200 to allow the insertion of the external plug. After the external plug is pulled out, the rigid cover is installed back to reseal the opening.

In some embodiments, the sealing structure 220 may include an elastic cover attached to a side wall of the insertion groove near the opening. The elastic cover seals the opening when no external plug is inserted into the device 200. When an external plug is inserted into the opening, the elastic cover deforms from its original shape to let the external plug to go through. After the external plug is pulled out of the device 200, the elastic cover returns to its original shape and reseals the opening of the device 200.

Figure 3A:
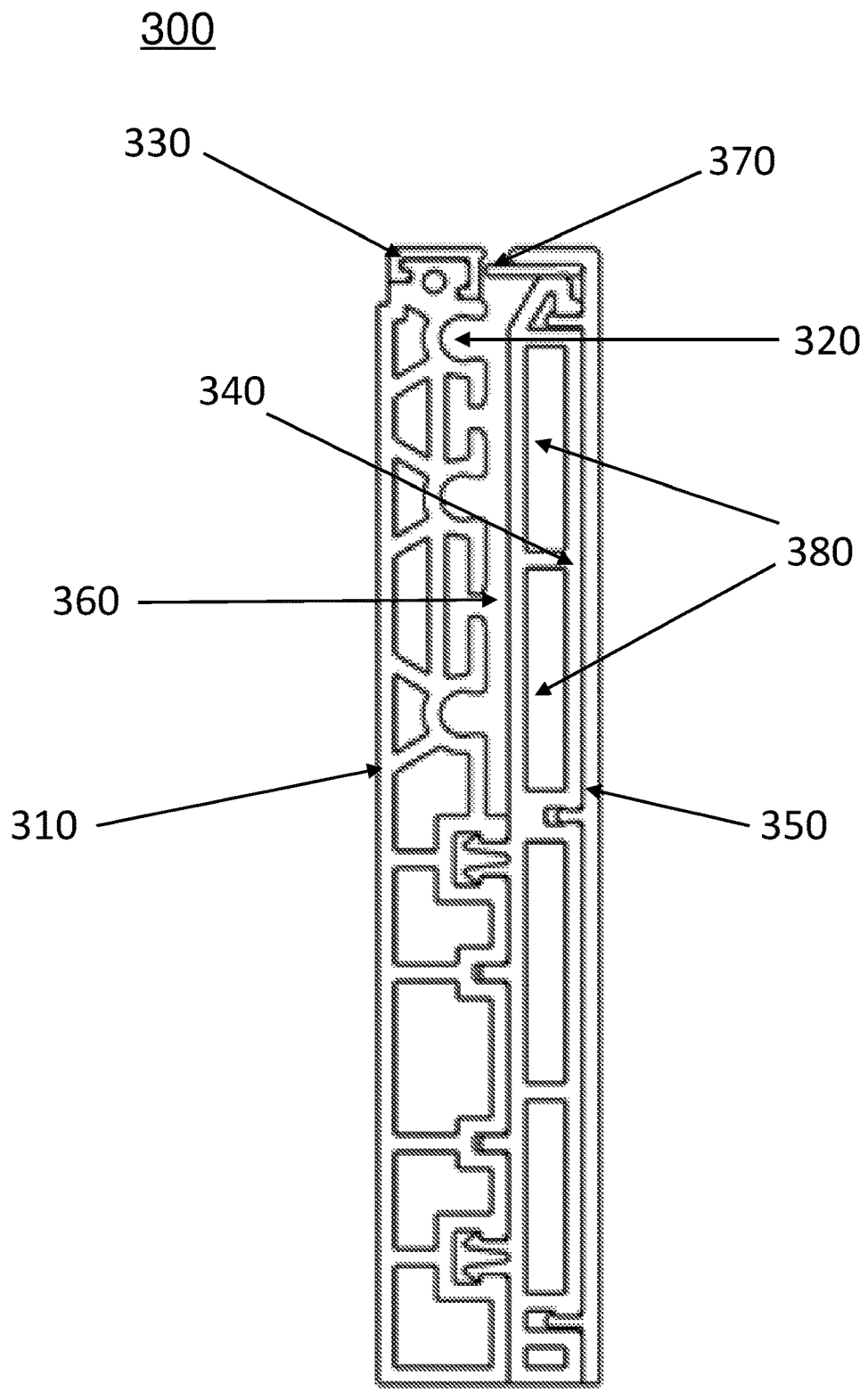
FIG. 3A illustrates a cross-sectional view of an exemplary electrical power transmission and outlet device according to some embodiments of the present disclosure.

FIG. 3A illustrates a cross-sectional view of an exemplary electrical power transmission and outlet device according to some embodiments of the present disclosure. As shown in FIG. 3A, the electrical power transmission and outlet device 300 may include a housing, an insertion groove 360, a plurality of chambers 380, and a plurality of concave slots 320. The housing includes a front board 340, a back board 310, and a top board 330.

In some embodiments, the back board 310, top board 330, and front board 340 form the outer shell of the housing. The back board 310 and the front board 340 have similar length and height. Furthermore, the back board 310 and the front board 340 are removably attached and a plurality of gaps are formed in between, including the insertion groove 360. More particularly, the top board 330 is installed perpendicular to the back board 310 and the front board 340. In some embodiments, the top board 330 is removably attached to the back board 310.

In some embodiments, the back board 310, the front board 340 and the top board 330 are made of solid material such as wood, metal, glass fiber, plywood, plastic material, composite material, etc. Alternatively, the back board 310, the front board 340 and the top board 330 are made of a flexible material such as rubber, fabric, PVC etc.

As shown in FIG. 3A, a front board cover 350 may be removably attached to the front board 340. The front board cover 350 may have the same length and height as the front board 340 to completely cover the front board 340. Furthermore, the front board cover 350 is made to appear that the whole device is made of an uncommon material such as marble, rosewood, liquid crystal, etc.

In some embodiments, the back board 310 of the housing is mounted on a surface such as a wall, a ceiling, a floor, a table, a corner, a window etc. Furthermore, the front board cover 350 is made to appear that the whole device is a part of the surface.

In some embodiments, the plurality of chambers 380 may be formed inside the housing. More particularly, the chambers 380 are formed inside the front board 340. Furthermore, the plurality of concave slots 150 are formed on an inner side of the back board 310, which becomes the side wall of the insertion groove when the front and back boards are attached to each other. Alternatively, some concave slots may be formed on an inner side of the back board 310 and other concave slots may be formed on an inner side of the front board 340. Both inner sides become the side walls of the insertion groove formed when the front and back boards are attached together. As shown in FIG. 3A, three concave slots 320 are formed on the inner side of the back board 310.

In some embodiments, the sealing structure 370 may be removably attached to an inner side of the top board 330. Similar to the sealing structure 220, the sealing structure 370 prevents water or moisture from leaking into the electrical power transmission and outlet device 300. Furthermore, it opens when the external plug is inserted into the insertion groove 360 and closes when the external plug is pulled out of the insertion groove 360.

Figure 3B:
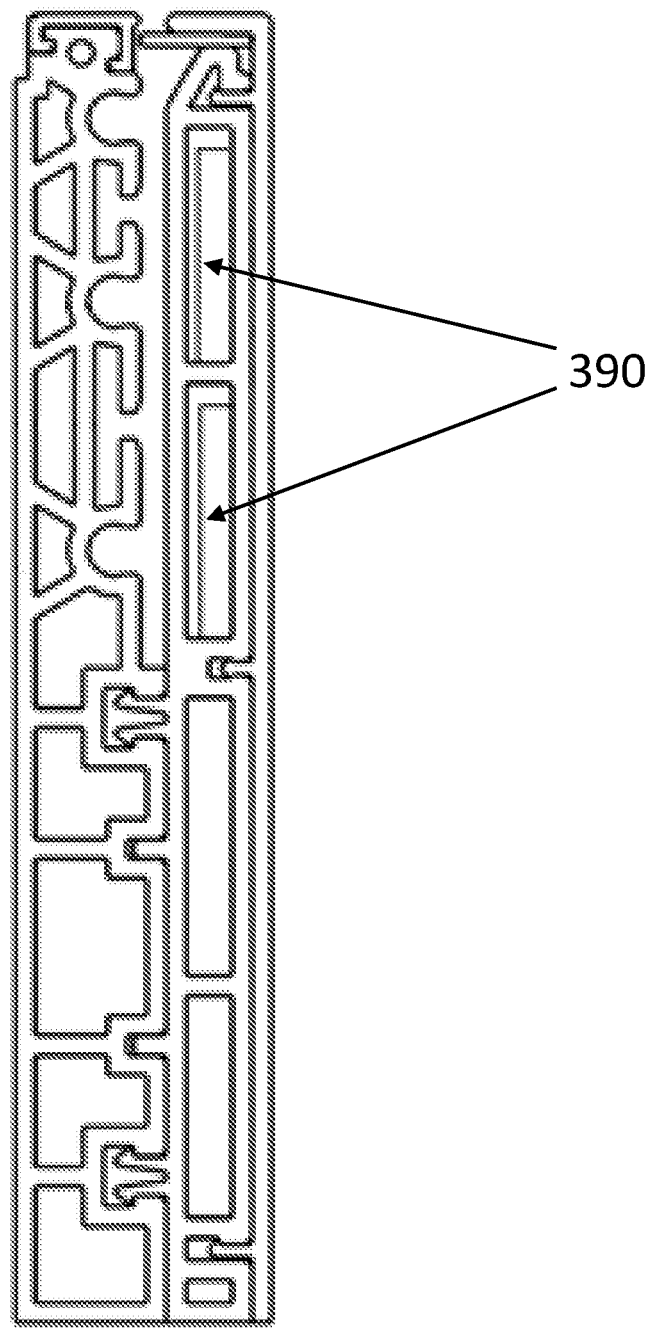
FIG. 3B illustrates a cross-sectional view of an exemplary electrical power transmission and outlet device connected to a plurality of power storage units according to some embodiments of the present disclosure.

FIG. 3B illustrates a cross-sectional view of an exemplary electrical power transmission and outlet device connected to a plurality of power storage units according to some embodiments of the present disclosure. This figure illustrates the same elements as explained with reference to FIG. 3A except that the electrical power transmission and outlet device 300 further includes a plurality of power storage units 390 such as a rechargeable battery, a capacitor, a power adaptor, a power generator, etc. In some embodiments, the power storage units 390 are stored in the plurality of chambers 380. Furthermore, the power storage units 390 may supply electricity to the plug when the conductors lose power similar to the embodiment shown in FIG. 1B.

Figure 4:
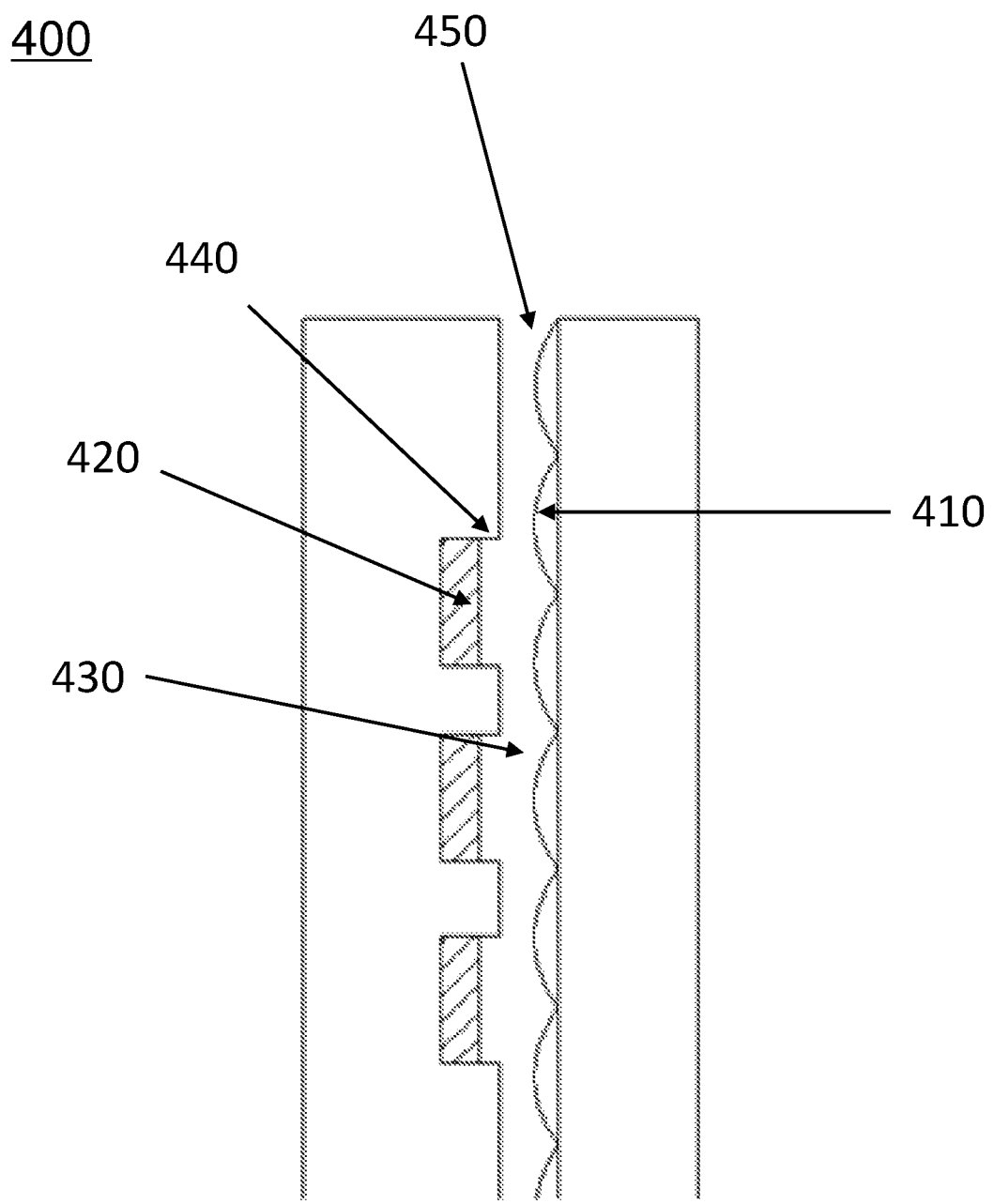
FIG. 4 illustrates an exemplary plug insertion section of the electrical power transmission and outlet device according to some embodiments of the present disclosure.

FIG. 4 illustrates an exemplary plug insertion section of the electrical power transmission and outlet device according to some embodiments of the present disclosure. As shown in FIG. 4, the plug insertion section 400 may include an insertion groove 430, a plurality of concave slots 440, a plurality of conductors 420, and a plurality of elastic embossments 410. The insertion groove 430 has an opening 450 on its top side for receiving an external plug. In some embodiments, the three rectangular-shaped concave slots 440 may be formed on a side wall of the insertion groove 430. Three flat conductors are placed inside said three rectangular concave slots, respectively. The plurality of elastic embossments 410 are placed on an opposite side wall of the insertion groove 430. In some embodiments, the conductors 420 may be made of rigid materials.

In some embodiments, the external plug has three protrusions which are configured to fit into the three concave slots to connect to the three conductors respectively when the external plug is inserted into the insertion groove. For example, when the external plug is inserted into the insertion groove 430 through the opening 450, the elastic embossments 410 may slightly deform from their original shape to let the external plug to go through and when the external plug reaches the position where the three protrusions can fit into the three concave slots, the deformed elastic embossments 410 pushes and holds these protrusions into the concave slots so that they are electrically connected to the conductors 420 in the slots.

Figure 5:
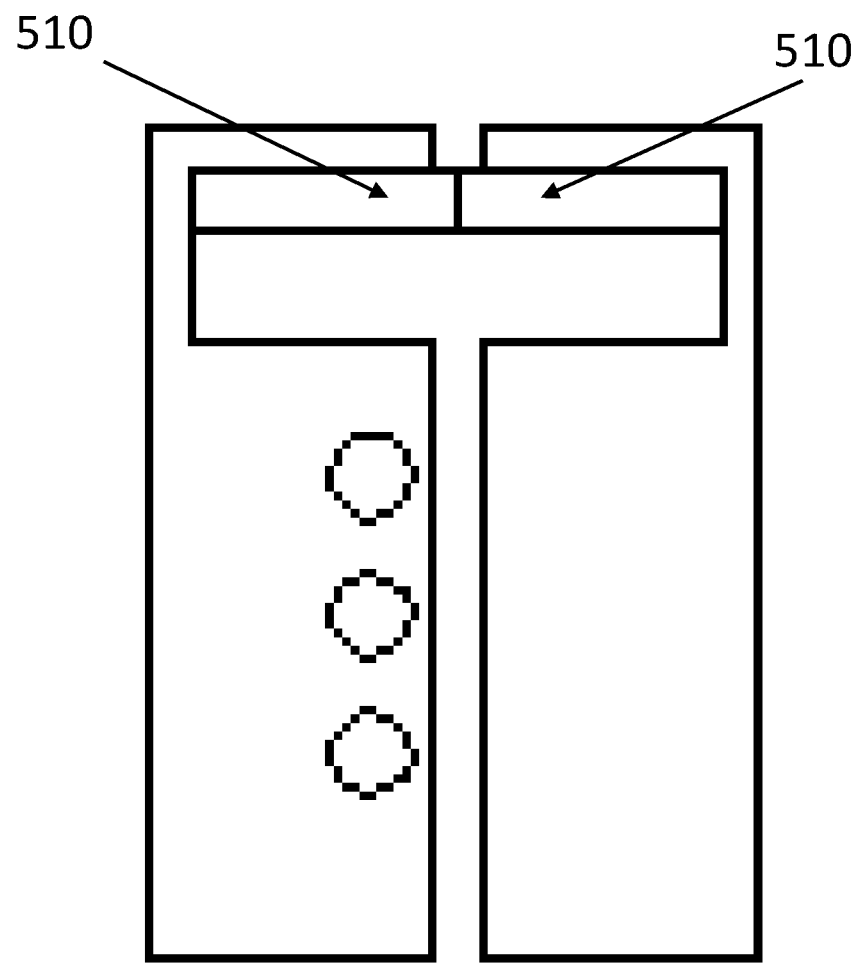
FIG. 5 illustrates an exemplary sealing structure of an electrical power transmission and outlet device according to some embodiments of the present disclosure.

FIG. 5 illustrates an exemplary sealing structure of an electrical power transmission and outlet device according to some embodiments of the present disclosure. The sealing structure may include an elastic cover installed at the opening. The elastic cover is attached to an inside wall of the opening. As shown in FIG. 5, the elastic cover has two elastic boards 510. The elastic boards 510 are attached to two opposing inside walls of the opening, respectively and the two elastic boards tightly touch with each other without any gap in between. For example, when an external plug is inserted into the opening, part of each elastic board 510 bends downwards from its original position to allow the external plug to go through. When the external plug is pulled out of the insertion groove, the elastic boards 510 return back to their original conditions. Alternatively, the elastic cover may have one elastic board attaching to one sidewall of the opening. The end of the board that is not attached to the sidewall may tightly touch with the opposite sidewall. This end of the board bends downwards when an external plug is inserted and restores when the plug is pulled out.

Figure 6:
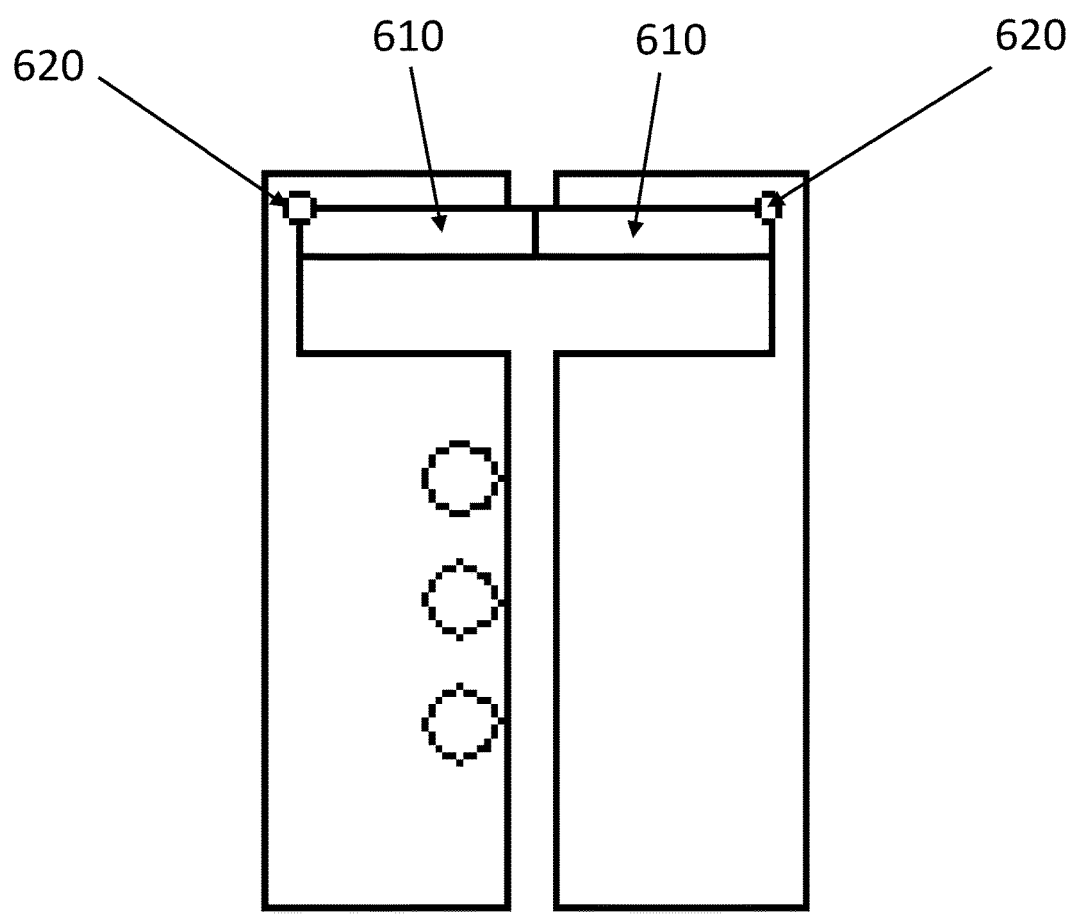
FIG. 6 illustrates an exemplary sealing structure of an electrical power transmission and outlet device according to some embodiments of the present disclosure.

FIG. 6 illustrates an exemplary sealing structure of an electrical power transmission and outlet device according to some embodiments of the present disclosure. The sealing structure 600 may include one or more rigid boards and one or more rotation shafts. The one or more rotation shafts are rotatably attached to one or more inside walls of the opening and the one or more rigid boards are each connected to a corresponding rotation shaft so that it may rotate along a rotation axis of the rotation shaft. As shown in FIG. 6, two rotation shafts 620 are rotatably attached to two opposite inside walls of the opening, and two rigid boards 610 are each attached to one rotation shaft 620. Furthermore, the two rigid boards tightly touch with each other without any gap in between.

For example, when an external plug is inserted into the opening, the rigid boards, together with the rotation shafts, rotates downwards from an original position. Furthermore, the rotation shafts 620 may each include a snap ring (not shown in the figure) which is an elastic ring that exerts a rotational force when rotated from a balanced position. In some embodiments, when the external plug is inserted, the rotation shafts rotate downwards, causing each snap ring to rotate out of its balanced position as well. When the external plug is pulled out, the snap rings return to their balanced position and forces the rigid boards to return back to the original position.

Figure 7:
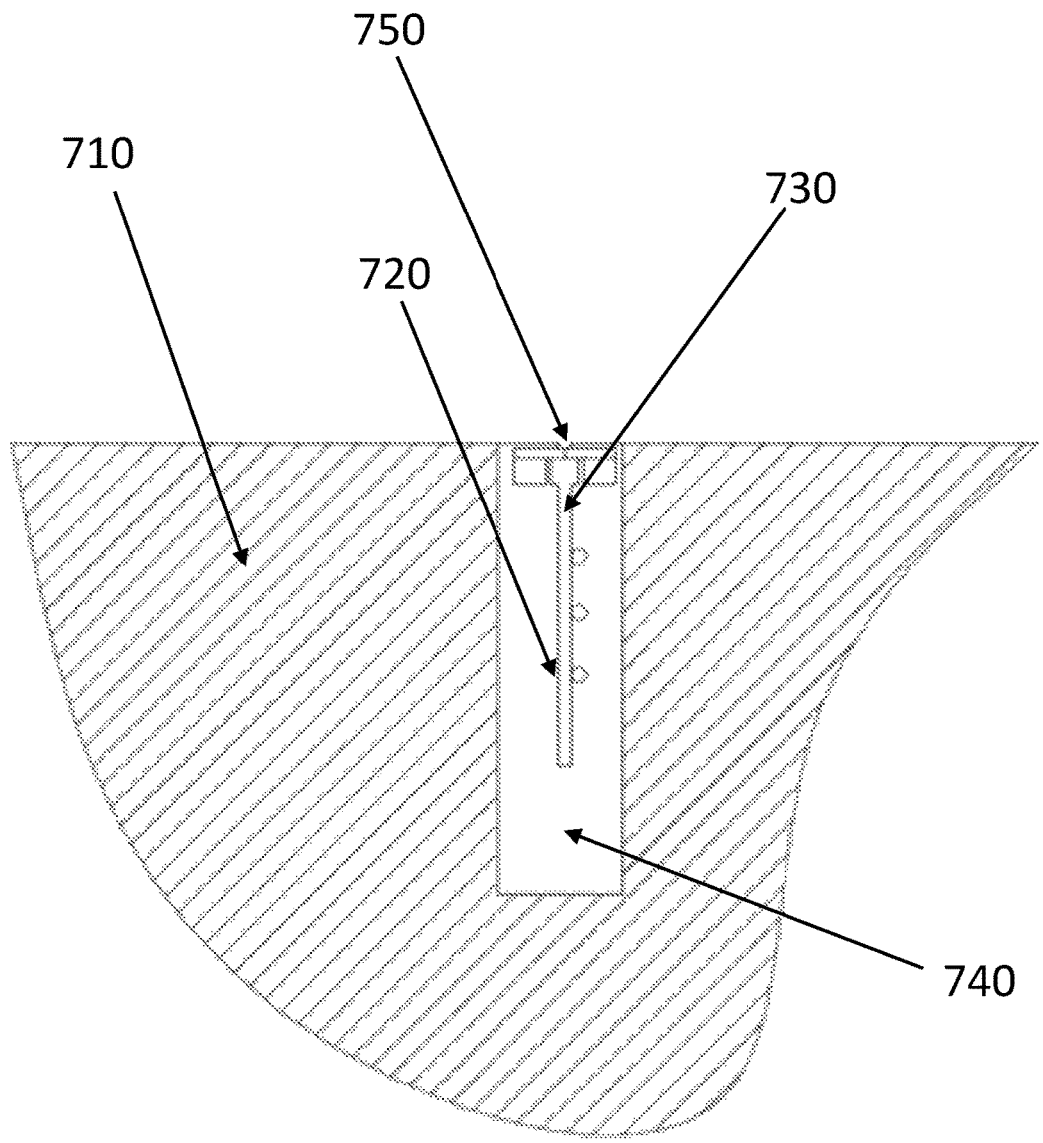
FIG. 7 illustrates an exemplary sealing structure of an electrical power transmission and outlet device embedded into a base structure according to some embodiments of the present disclosure.

FIG. 7 illustrates an exemplary sealing structure of an electrical power transmission and outlet device embedded into a base structure according to some embodiments of the present disclosure. As shown in FIG. 7, a simplified illustration of an electrical power transmission and outlet device 720 may be completely embedded into a base structure 710 such as a wall, a ceiling, a floor, a table, a window, etc. The base structure 710 has a chamber 740 to store the electrical power transmission and outlet device 720. In some embodiments, the device has a height that's roughly equal to the depth of the chamber 740 and a width that's slightly smaller than that of the chamber 740. For example, the device 720 is embedded inside the chamber 740 by attaching to the opposite side walls of the chamber 740. The base structure 710 may be insulated and fire-proofed. Alternatively, the device has a height that's greater than the depth of the chamber 740 and the upper part of the device 720 is outside the base structure 710.

Figure 8:
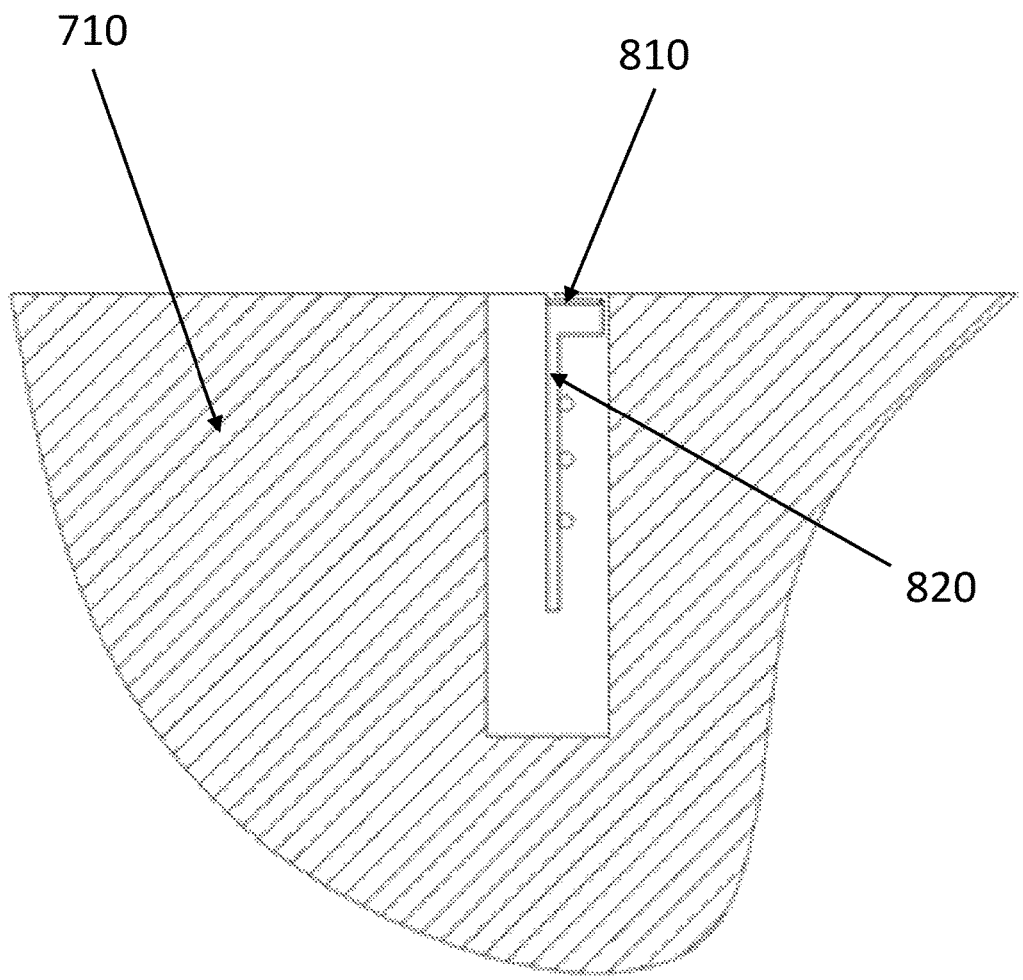
FIG. 8 illustrates an exemplary sealing structure of an electrical power transmission and outlet device embedded into a base structure according to some embodiments of the present disclosure.

FIG. 8 illustrates an exemplary sealing structure of an electrical power transmission and outlet device embedded into a base structure according to some embodiments of the present disclosure. As shown in FIG. 8, a simplified illustration of an electrical power transmission and outlet device 820 may be completely embedded into a chamber 740 of a base structure 710. The sealing structure 810 may include a rigid board and a rotation shaft. Similar to the embodiments shown in FIG. 7, the device has a height that's roughly equal to the depth of the chamber 740 and a width that's slightly smaller than that of the chamber 740. For example, the device 820 is embedded inside the chamber 740 by attaching to the opposite side walls of the chamber 740

Figure 9:
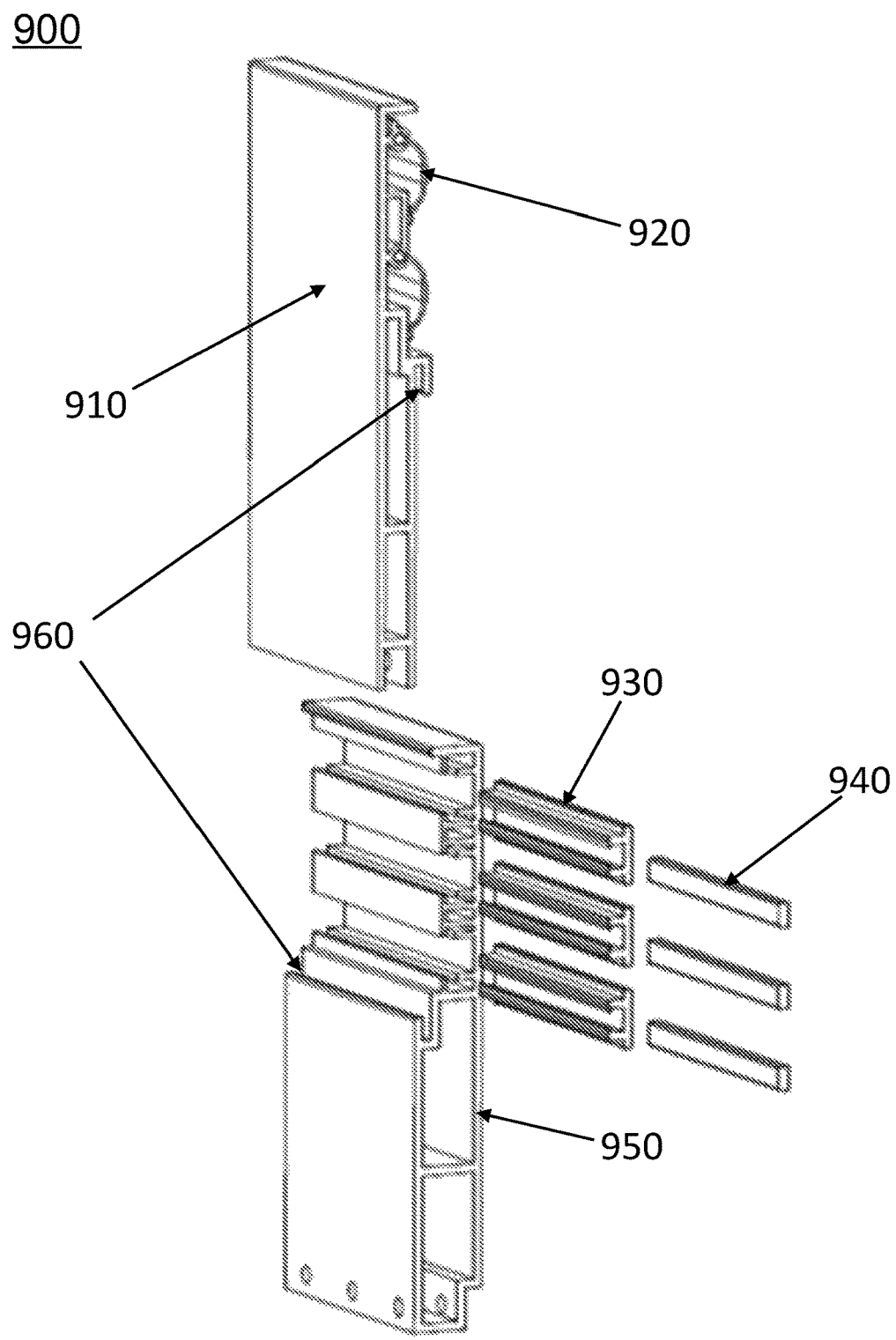
FIG. 9 illustrates an exploded view of an exemplary electrical power transmission and outlet device according to some embodiments of the present disclosure.

FIG. 9 illustrates an exploded view of an exemplary electrical power transmission and outlet device according to some embodiments of the present disclosure. As shown in FIG. 9, the electrical power transmission and outlet device 900 may include a back board 910 and a front board 950. The back board 910 and the front board 950 are connected by a connecting structure formed on the boards. In some embodiments, the connecting structure includes a hook 960 on each board and the two hooks can engage each other to connect the two boards. Alternatively, the connecting structure may have a pair of attaching units such as a protrusion and a notch formed on the two boards respectively so that they are connected.

In some embodiments, a plurality of elastic embossments may be placed on an inner side of the front board 910 and a plurality of conductor supports 930 as shown in FIG. 9 may be installed on an inner side of the back board 950. Both inner sides become the side walls of the insertion groove formed when the front and back boards are attached together. The conductor supports 930 are made of an insulating material such as plastic, rubber, glass, ceramic, etc. Furthermore, the conductor supports may include a plurality of concave slots for placing a plurality of conductors 940. When the front board 910 and the back board 950 are connected, the position of the elastic embossments 920 may match the position of the concave slots so that when the external plug is inserted between the front board 910 and the backboard 950 the elastic embossments 920 pushes and holds the external plug into the concave slots.

Figure 10:
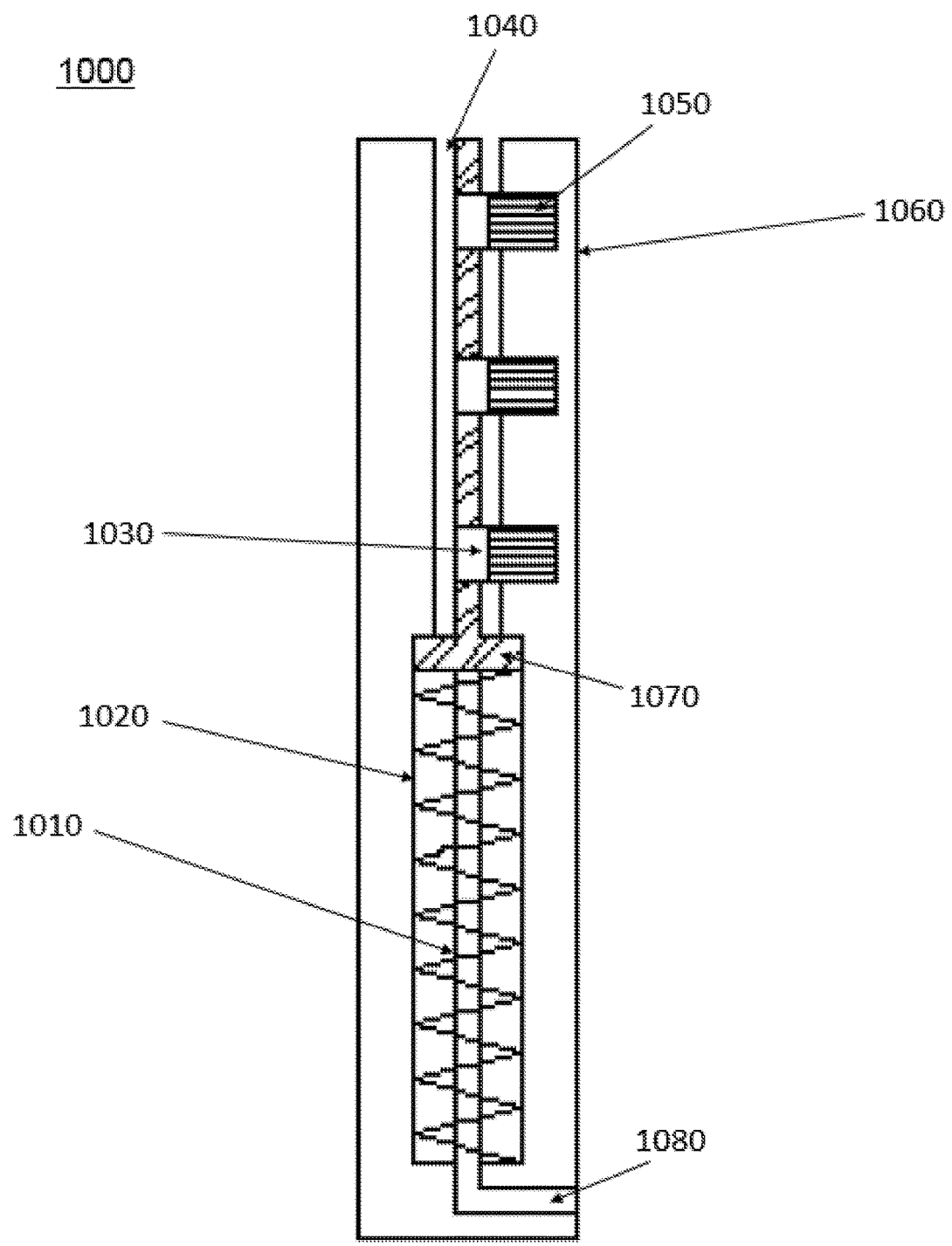
FIG. 10 illustrates an exemplary electrical power transmission and outlet device according to some embodiments of the present disclosure.

FIG. 10 illustrates an exemplary electrical power transmission and outlet device according to some embodiments of the present disclosure. As shown in FIG. 10, the electrical power transmission and outlet device 1000 has a housing 1060, an insertion groove 1040 formed inside the housing and having an opening on one side of the housing, a switch chamber 1020 formed inside the housing and located underneath the insertion groove, a spring 1010 installed in the switch chamber, and a switch connector 1070 that is positioned inside the insertion groove and may be pushed to slide into the switch chamber.

As shown in FIG. 10, the insertion groove 1040 has two sidewalls in the housing 1060 and an opening on the top side of the housing. The insertion groove 1040 is used for receiving an external plug (not shown in the figure). A plurality of concave slots (e.g., 3 slots) is formed on a side wall of the insertion groove 1040 and each slot may hold an electrical conductor. These conductors 1050 may be connected to a hot wire, a neutral wire, and a ground wire, respectively. To improve the safety of the device, the hot wire may be connected to the conductor that is farthest from the opening of the insertion groove 1040. The connector 1070 has an upper portion and a bottom portion. In some embodiments, the upper portion has a height that's roughly equal to the depth of the insertion groove 1040. Its width is slightly narrower than that of the insertion groove 1040. The bottom portion of the connector 1070 is slightly wider but much shorter than the upper portion. The upper portion is placed in the insertion groove 1040 and the bottom portion is placed in the switch chamber 1020. As shown in FIG. 10, the switch chamber 1020 is formed slightly wider than the insertion groove 1040 to accommodate the bottom portion of the connector 1070.

In some embodiments, the connector 1070 may have a plurality of protrusions 1030 formed on a surface of its upper portion. The protrusions 1030 are configured such that each protrusion is in contact with a corresponding conductor 1050 when the upper portion of the connector 1070 is fully contained in the insertion groove 1040. In some embodiments, the connector 1070 is made of an insulation material such as glass, plastic, ceramic, wood, etc. and the protrusions 1030 are made of a conducting material such as metal, alloy, etc. The connector 1070 may further include a conducting port 1080 connected to one of its ends. The conducting port 1080 is connected to a power storage unit such as a rechargeable battery, a capacitor, a power adaptor, or a power generator.

As shown in FIG. 10, the spring 1010 is installed in the switch chamber 1020. One end of the spring 1010 is connected to the connector 1070 and the other end of the spring 1010 is connected to the bottom of the switch chamber 1020. As such, the spring 1010 holds or pushes the connector 1070 so that its upper portion is fully positioned inside the insertion groove 1040. When the connector 1070 is pushed down by an external plug the spring 1010 is compressed by the external force to allow the connector 1070 to slide into the switch chamber 1020. When the external plug is removed, the spring 1010 restores to its original condition and forces the connector to slide back to the insertion groove 1040.

In some embodiments, when the insertion groove 1040 hasn't received an external plug, the connector 1070 is electrically connected to the conductors 1050, allowing the power storage unit to receive electricity from the electrical power transmission and outlet device. When an external plug is inserted into the insertion groove 1040, the connector is displaced from its original position and is disconnected from the conductors. Instead, when the external plug is fully inserted into the insertion groove 1040, such conductors are electrically connected to the external plug, allowing a device or appliance connected to the external plug to receive electricity from the electrical power transmission and outlet device. When the inserted external plug is pulled out of the insertion groove 1040, the spring 1010 pushes the connector 1070 back to the insertion groove 1040 to be reconnected to the conductors 1050 at its original position.

In some embodiments, the power storage unit may be a power generator such as a solar panel system, a wind turbine system, or a dynamo. When the conductors 1050 are electrically connected to the connector 1040, the power generator may contribute electricity back to the power grid via this electrical power transmission and outlet device 1000.

Figure 11:
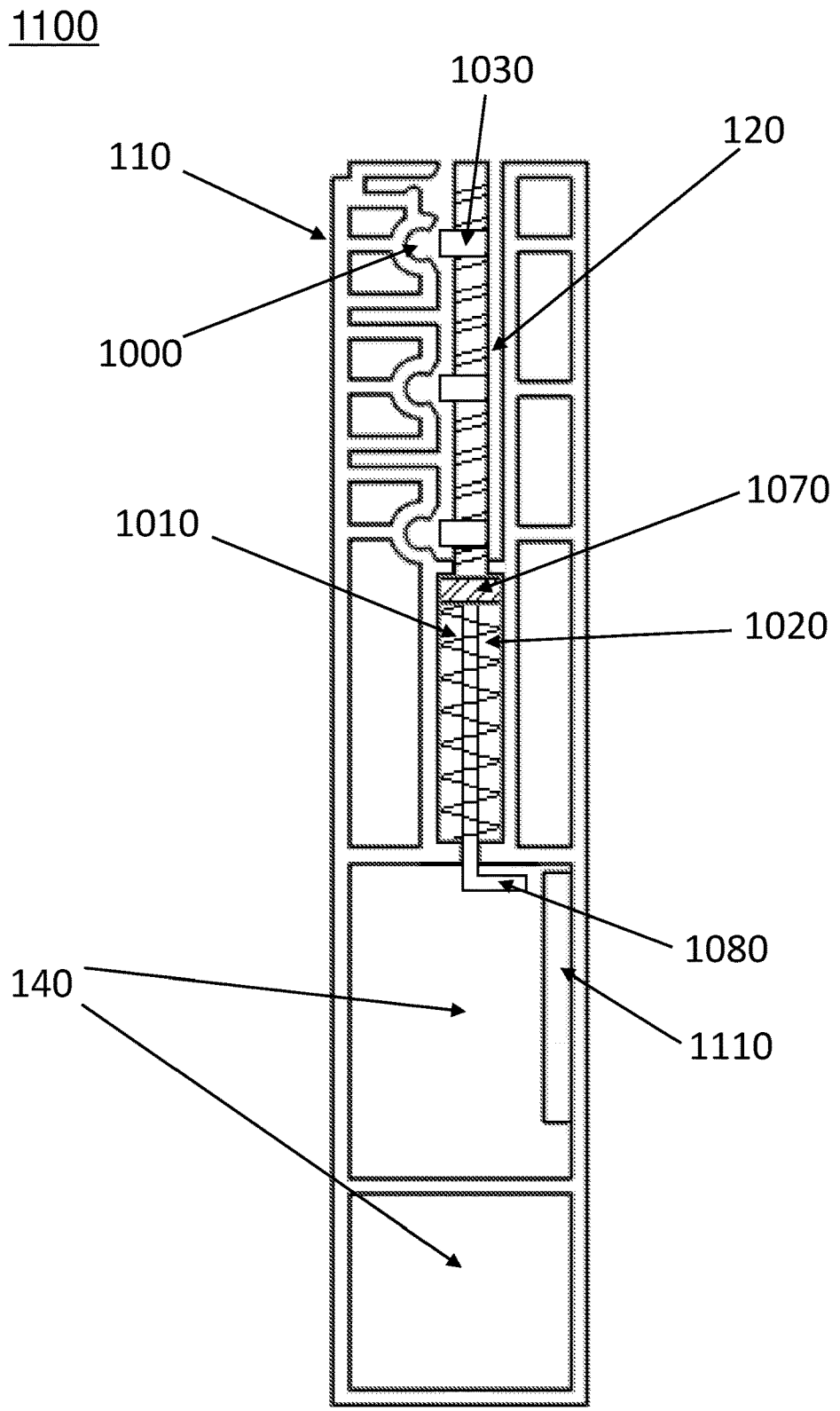
FIG. 11 illustrates an exemplary electrical power transmission and outlet device according to some embodiments of the present disclosure.

FIG. 11 illustrates an exemplary electrical power transmission and outlet device 1100 according to some embodiments of the present disclosure. Similar to the embodiment shown in FIG. 10, the electrical power transmission and outlet device 1100 has a housing 110, an insertion groove 120, a switch chamber 1020, a spring installed inside the switch chamber 1010, and a connector 1070 that is positioned inside the insertion groove 120 and may be pushed to slide into the switch chamber 1020. In addition, the electrical power transmission and outlet device 1100 has a plurality of chambers 140 for channeling and storing wires (e.g., electricity transmission wire, data transmission wire) and/or holding a power storage unit.

For example, several chambers as shown in FIG. 11 are formed inside the housing 110 and a power storage unit 1110 connecting to the connector 1070 is stored in one of the chambers. The connector 1070 has a conducting port 1080 placed on one of its ends and the conducting port 1080 is connected to the power storage unit 1110. The connection is not interrupted when the connector slides up and down.

Furthermore, the housing 110 has three concave slots 1000 formed on a side wall of the insertion groove 120 and the concave slots 1000 each hold an electrical conductor (not shown in the figure). The connector has three protrusions 1030 for connecting to the conductors installed in the concave slots.

In some embodiments, the housing 110 has an opening for receiving an external plug. When the device hasn't received such an external plug, the connector is electrically connected to the conductors, allowing the power storage unit to receive electrical power from the conductors in the housing. When an external plug is inserted into the device, the connector 1070 is displaced from its original position and is disconnected from the conductors. Instead, when the external plug is fully inserted into the insertion groove, such conductors are electrically connected to the external plug, allowing a device or appliance connected to the external plug to receive electricity from the conductors in the housing. When the inserted external plug is pulled out of the device, the connector is pushed back to the original position by the spring 1010 and is reconnected to the conductors.

Figure 12:
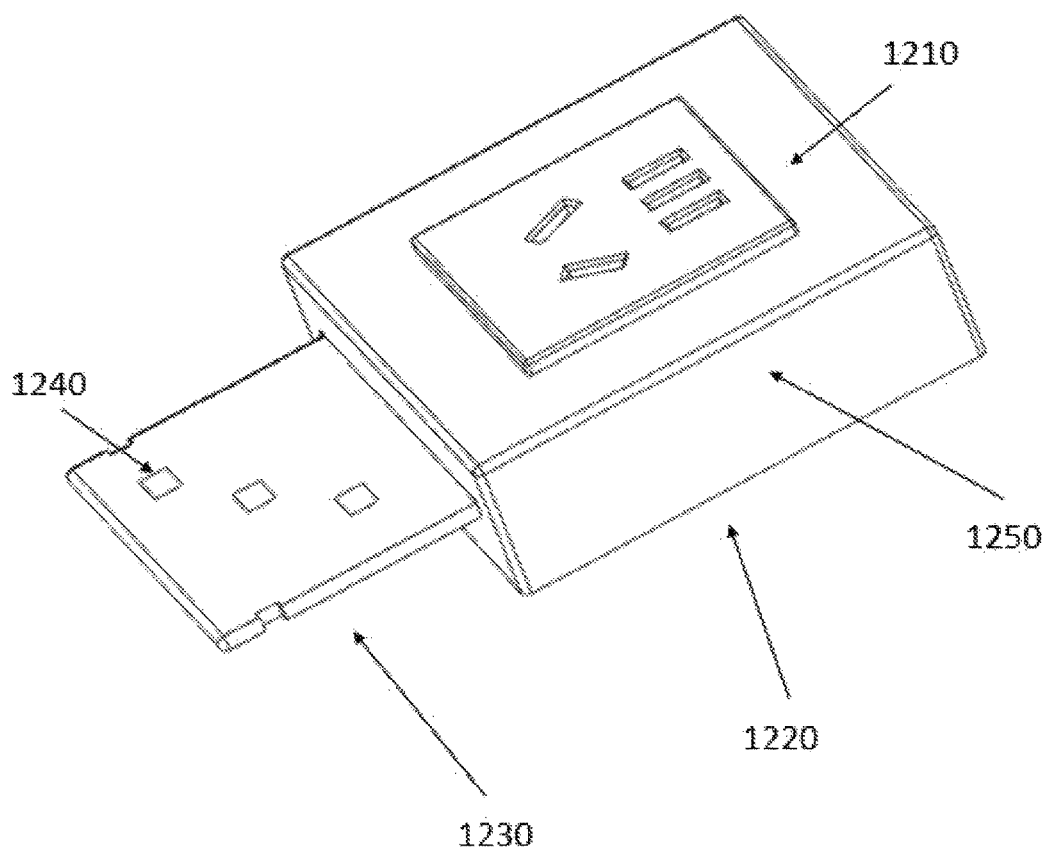
FIG. 12 illustrates a perspective view of an exemplary external plug according to some embodiments of the present disclosure.

FIG. 12 illustrates a perspective view of an exemplary external plug according to some embodiments of the present disclosure. As shown in FIG. 12, the external plug 1200 includes a plug body 1220 and a plug board 1230. The plug board 1230 may be slided or folded into the plug body 1220 to prevent it from being damaged when not in use. In some embodiments, the plug board 1230 may include a plurality of elastic contacts placed on at least one side of its surface. The elastic contacts are made of a conducting material such as metal, alloy, etc. Merely by way of example, the plug board 1230 as shown in FIG. 12 has three elastic contacts 1240 placed on one side of its surfaces. More particularly, the elastic contacts 1240 may be positioned so that when the external plug 1200 is inserted in an electrical power transmission and outlet device in the present disclosure, the elastic contacts are electrically connected to the conductors of the electrical power transmission and outlet device, such as the conductors 1050 in FIG. 10.

Alternatively, the plug board 1230 may include six elastic contacts, of which three elastic contacts are placed on one side of the plug board 1230 and the remaining three are placed on the other side of the plug board 1230. The plug board 1230 may further include an elastic contact placed on its bottom edge. Alternatively, the elastic contacts may be placed on different sides or edges of the plug board 1230.

The external plug illustrated in FIG. 12 also has a socket part. The plug body 1220 has a back shell 1250 and a front cover 1210 detachably connected to the back shell 1250. A socket core (not shown in the figure) and its conductors are electrically connected to the elastic contacts through electrical wires or the like inside the plug body 1220. For example, co-pending PCT application No. PCT/CN2016/085142, titled "A MOVABLE SOCKET ASSEMBLY" filed on Jun. 7, 2016 describes the details of such a plug. The contents of PCT application No. PCT/CN2016/085142 are hereby incorporated by reference.

Figure 13:
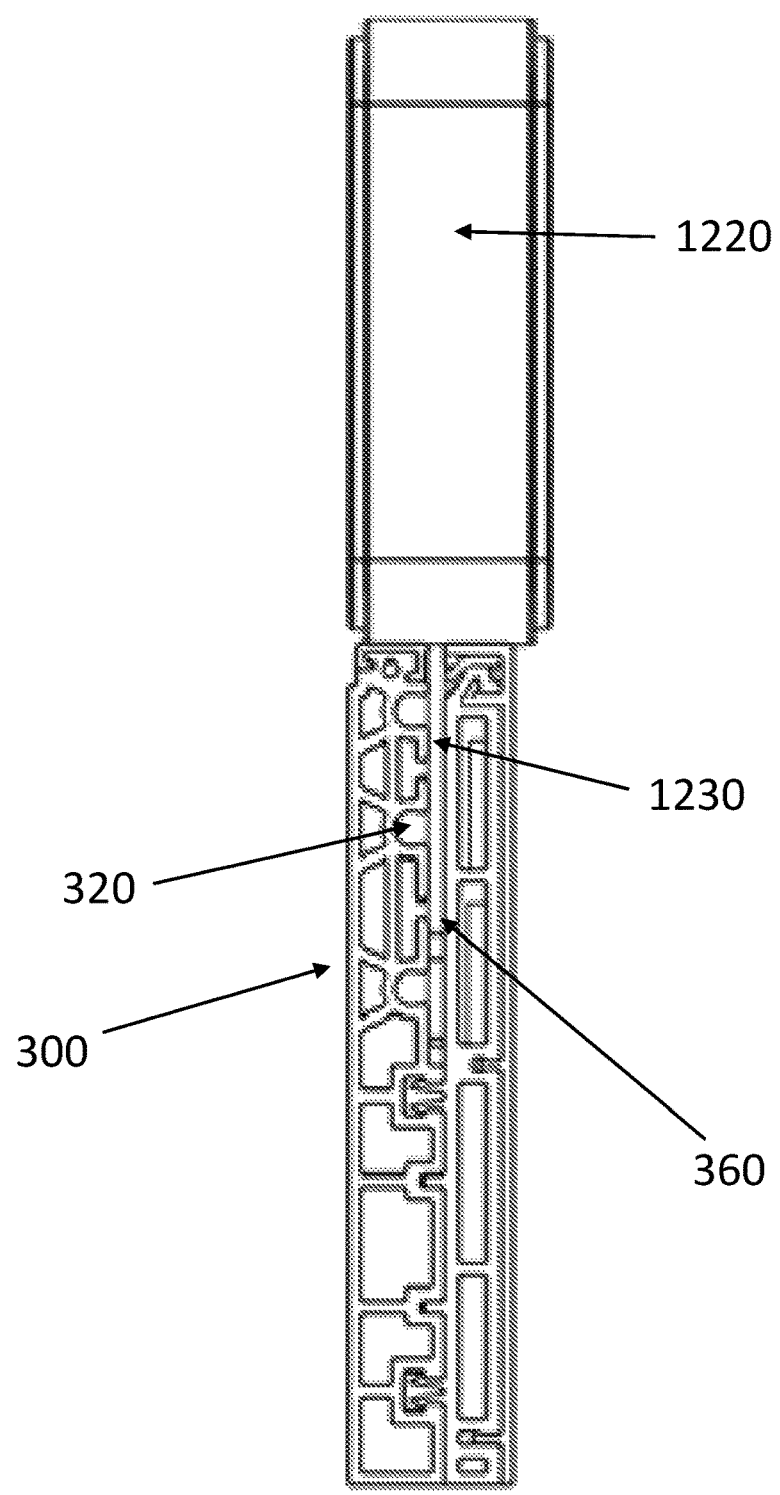
FIG. 13 illustrates a cross-sectional view of an electrical power transmission and outlet device when an external plug is inserted into the device according to some embodiments of the present disclosure.

FIG. 13 illustrates a cross-sectional view of an electrical power transmission and outlet device when an external plug is inserted into the device according to some embodiments of the present disclosure. As shown, the external plug has a plug body 1220 and a plug board 1230 which is inserted into an insertion groove through an opening of the electrical power transmission and outlet device 300. Furthermore, the plug board 1230 has three elastic contacts placed on one side of its surface. The contacts are each electrically connected to a conductor in a concave slot 320 of the electrical power transmission and outlet device 300, allowing a device or appliance connected to the external plug to receive electricity from the electrical power transmission and outlet device 300.

Figure 14:
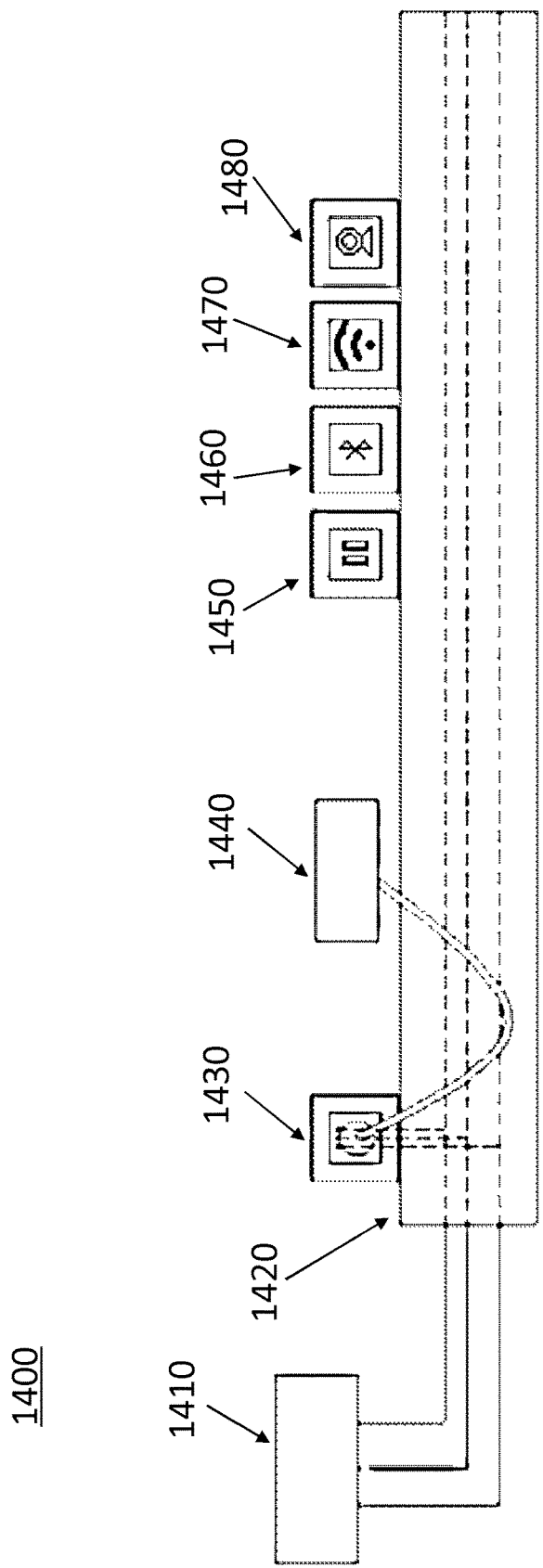
FIG. 14 illustrates an exemplary electrical power transmission and outlet system according to some embodiments of the present disclosure.

FIG. 14 illustrates an exemplary electrical power transmission and outlet system according to some embodiments of the present disclosure. As shown in FIG. 14, the electrical power transmission and outlet system 1400 may include a power source 1410, an electrical power transmission and outlet device 1420, and a plurality of external plugs. For example, the power source 1410 is a power grid that distributes electrical power to three conductors of the electrical power transmission and outlet device 1420 through a hot wire, a neutral wire and a ground wire. The plurality of external plugs as shown in FIG. 14 may include a socket 1430, a USB charger 1450, a Bluetooth™ supplier 1460, a WIFI supplier 1470, and a video monitoring system 1480. Such plurality of external plugs may have same plug housing and plug board as described in FIG. 13 but may contain different core or inner structure to realize different functions. Furthermore, the positions of the plurality of external plugs may be swapped or changed and the plurality of external plugs may slide in the length direction of the electrical power transmission and outlet device. In some embodiments, a device or appliance 1440 may be connected to the socket 1430 and receive electrical power from the power source 1410.

Figure 15:
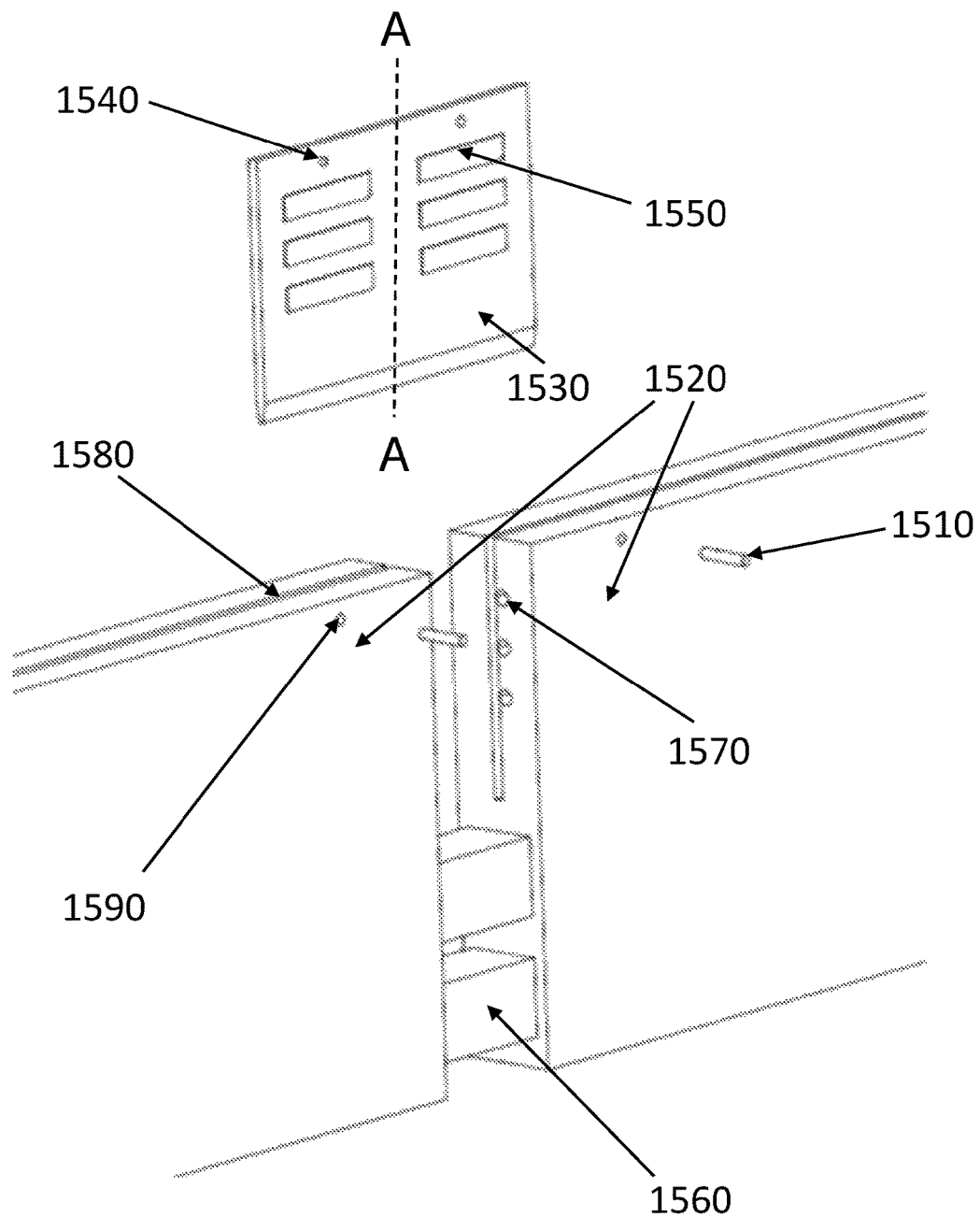
FIG. 15 illustrates an exemplary connection mechanism bridging two electrical power transmission and outlet devices according to some embodiments of the present disclosure.

FIG. 15 illustrates an exemplary connection mechanism bridging two electrical power transmission and outlet devices according to some embodiments of the present disclosure. As shown in FIG. 15, the connection mechanism may include a connection plug 1530, two fixation pins 1510, and a plurality of connection bricks 1560. The connection plug 1530 as shown in FIG. 15 has two holes 1540 formed on its front surface and the fixation pins are configured to fit into the two holes 1540 respectively. Furthermore, a plurality of conducting contacts may be installed on the front surface or the back surface of the connection plug. For example, six conducting contacts 1550 are placed on the front surface of the connection plug 1530. The connection plug 1530 as shown in the FIG. 15 is divided by a line AA into a left section and a right section and each section is connected to one of the two electrical power transmission and outlet devices 1520.

In some embodiments, the left section and the right section of the connection plug 1530 are symmetrical with respect to line AA, and each section includes three conducting contacts 1550 formed on the surface. More particularly, conducting contacts in the left section and the right section of the connection plug 1530 are in pairs that each conducting contacts in the left section is paired and electrically connected to a corresponding conducting contacts in the right section. For example, the corresponding conducting contacts are connected by a conducting component (not shown in the figure) inside connection plug. Furthermore, the two holes 1540 are symmetrically formed on the left section and the right section of the connection plug 1530.

In some embodiments, the electrical power transmission and outlet devices 1520 each includes a hole 1590 formed on the surface and the holes 1590 are configured to match the position and size of the holes 1540 of the connection plug 1530. For example, when the connection plug 1530 is inserted into the insertion grooves 1580 of the electrical power transmission and outlet devices 1520, the holes 1540 match the position of the holes 1590 and the fixation pins 1510 are then inserted into the holes 1540 and 1590 so that the connection plug is attached to both devices 1520. Furthermore, when the three conducting contacts 1550 of each sections of the connection plug 1530 match the position of three concave slots 1570 of the electrical power transmission and outlet device 1520 during the insertion, the conducting contacts are electrically connected to the conductors placed in the concave slots 1570, hence, two devices 1520 are electrically connected.

Similar to the embodiments shown in FIG. 1A, the electrical power transmission and outlet devices 1520 may each include a plurality of chambers (not shown in the figure) for channeling and storing wires (e.g., electricity transmission wires, data transmission wires) and/or holding a power storage unit. In some embodiments, a plurality of connection bricks 1560 may be connected to the plurality of chambers of both electrical power transmission and outlet devices 1520 for channeling and storing wires between two devices 1520. For example, two connection bricks 1560 as shown in FIG. 15 are mechanically connected to both electrical power transmission and outlet devices 1520. More particularly, the connection bricks 1560 are configured to fit into the chambers of the devices. Furthermore, the connection bricks 1560 may be hollow so that the wires stored in one device can pass through the bricks to the other device.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that more holes can be formed on the surface of the connection plug and the shape of the holes can be circular, rectangular, or triangular etc. provided the amount and the shape of the pins change correspondingly.

Figure 16A:
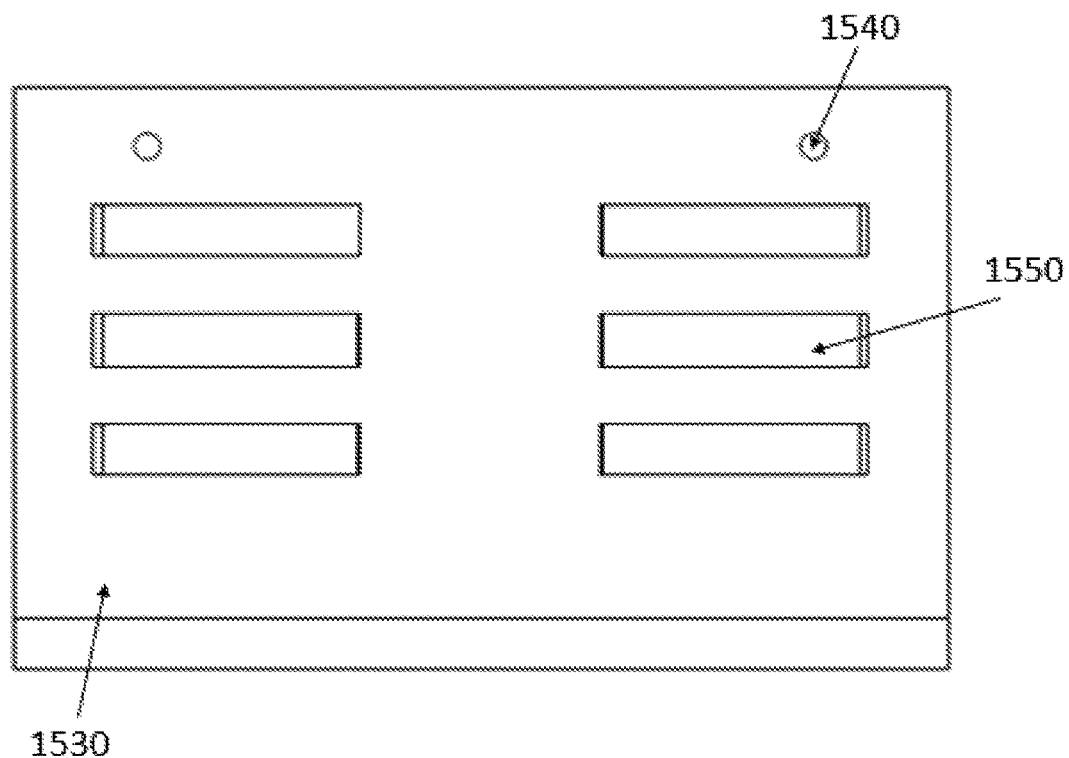
FIG. 16A illustrates a front view of an exemplary connection plug according to some embodiments of the present disclosure.

FIG. 16A illustrates a front view of an exemplary connection plug according to some embodiments of the present disclosure. Similar to the embodiments shown in FIG. 15, the connection plug 1530 may include two holes 1540 and six conducting contacts 1550 configured on its surface while one hole and three conducting contacts are configured on the left section and the remaining are configured on the right section. More particularly, the left and the right section of the connection plug 1530 are symmetrical. Furthermore, the holes 1540 may be formed near the top side of the connection plug and the distance between each three conducting contacts of a section are configured so that when the connection plug is inserted into the electrical power transmission and outlet devices 1520 as shown in FIG. 15, the position of the conducting contacts 1550 matches the position of the concave slots 1570 of the devices 1520.

Figure 16B:
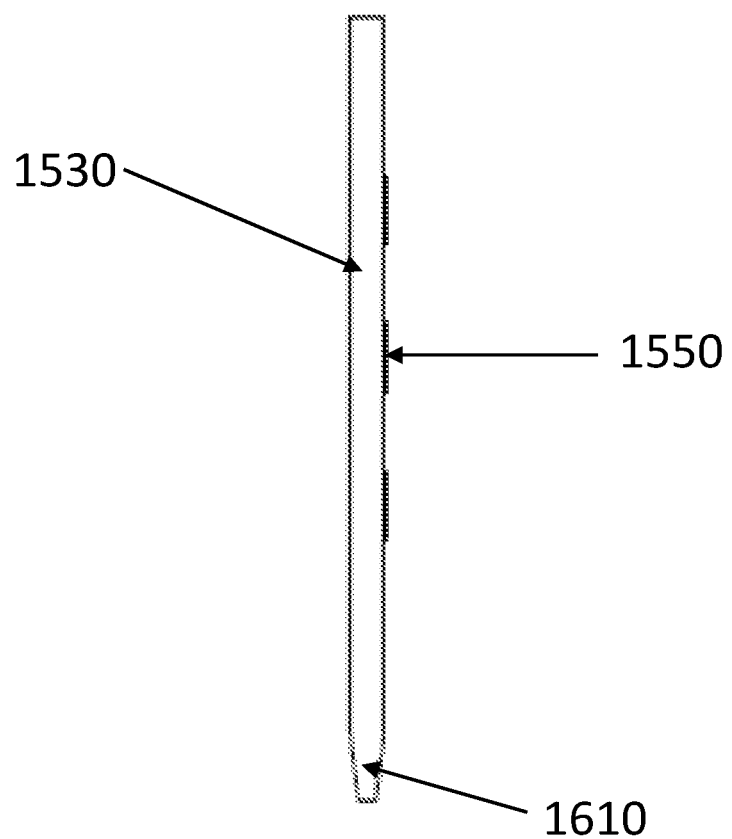
FIG. 16B illustrates a side view of an exemplary connection plug according to some embodiments of the present disclosure.

FIG. 16B illustrates a side view of an exemplary connection plug according to some embodiments of the present disclosure. In some embodiments, the connection plug 1530 has a height that's roughly equal to the depth of the insertion groove 1580 of the electrical power transmission and outlet device 1520 as shown in FIG. 15 and a width (also referred to as thickness) that's slightly smaller than that of the insertion groove 1580. Refer to FIG. 16B, the bottom side 1610 of the connection plug 1530 is tapered so that the connection plug receives less resistance when it is inserted into the insertion groove.

Figure 16C:
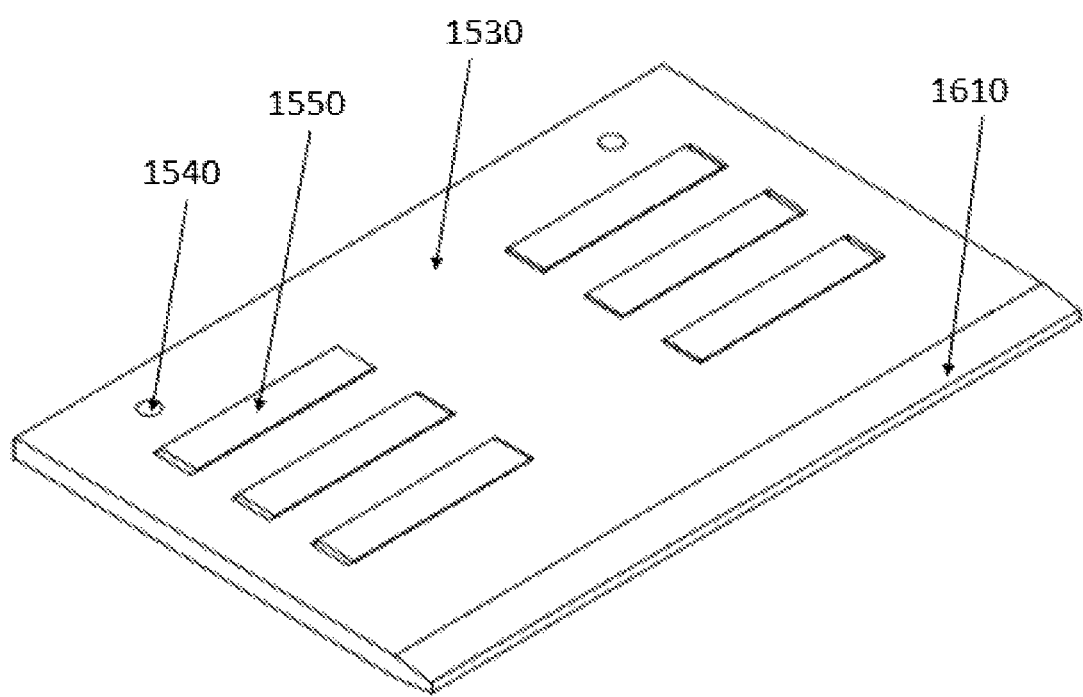
FIG. 16C illustrates a perspective view of an exemplary connection plug according to some embodiments of the present disclosure.

FIG. 16C illustrates a perspective view of an exemplary connection plug according to some embodiments of the present disclosure. As shown in the FIG. 16C, the width (also referred to as thickness) of the connection plug is much shorter than its height and its length.

Figure 17:
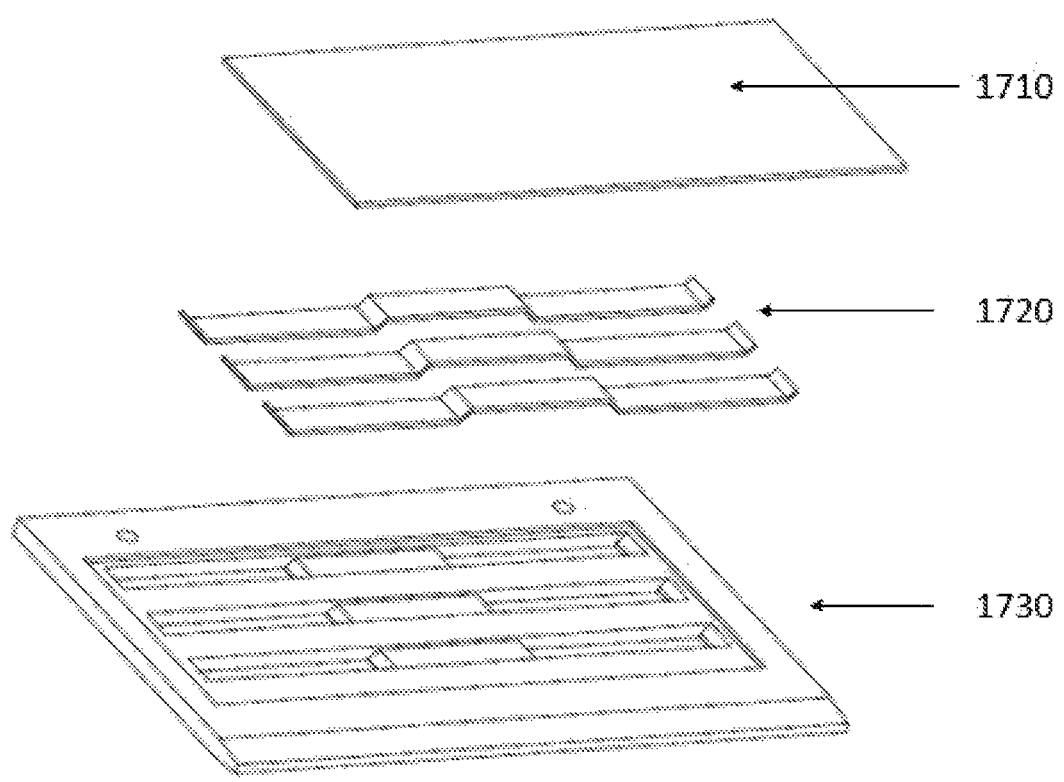
FIG. 17 illustrates an exploded view of an exemplary connection plug according to some embodiments of the present disclosure.

FIG. 17 illustrates an exploded view of an exemplary connection plug according to some embodiments of the present disclosure. As shown in FIG. 17, the connection plug 1530 includes a plug base 1730, a plurality of conducting strips 1720 and a cover 1710. The two end portions of each conducting strip 1720 are bended slightly to become two conducting contacts. The plug base 1730 includes six rectangular windows for placing the conducting contacts so that when the conducting strips 1720 are attached to the plug base 1730, the conducting contacts of the conducting strips 1720 are exposed on the front surface of the connection plug 1530. Furthermore, the surface of the conducting strips 1720 may be connected to the cover 1710 and the cover 1710 may be configured to fit into the plug base as shown in FIG. 17.

In some embodiments, the cover 1710 is glued to the plug base 1730. Alternatively, the cover 1710 is connected to the plug base 1730 by pins, fasteners, hook structures etc. Furthermore, the plug base 1730 and the cover 1710 are made of an insulating material such as plastic, rubber, glass, ceramic, etc. while the conducting strips 1720 are made of a conducting material such as metal, alloy etc. In some embodiments, the conducting strips 1720 and the cover 1710 are made of a ductile material with enough elasticity so that when the connection plug 1530 is slightly deformed, the elasticity keeps it unbroken.

Figure 18:
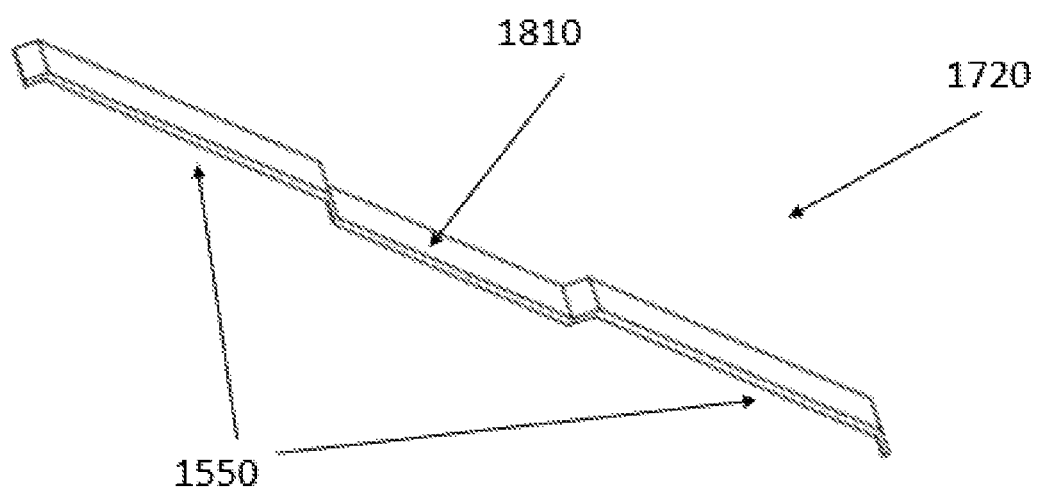
FIG. 18 illustrates an exemplary conducting strip according to some embodiments of the present disclosure.

FIG. 18 illustrates an exemplary conducting strip according to some embodiments of the present disclosure. As shown in FIG. 18, the conducting strip 1720 includes two conducting contacts 1550 on the sides connected by a conducting component 1810 in the middle. The conducting contacts 1550 and the conducting component 1810 may be made of same material. Furthermore, the two end portions of each conducting strip 1720 are bended slightly to become the two conducting contacts 1550. For example, when the conducting strip 1720 is attached to a back surface of a plug base, the conducting contacts of the conducting strip 1720 are exposed on the front surface of the plug base. The conducting component 1810 instead are attached to a solid section of the plug base and are not exposed on the front surface of the plug base.

Figure 19A:
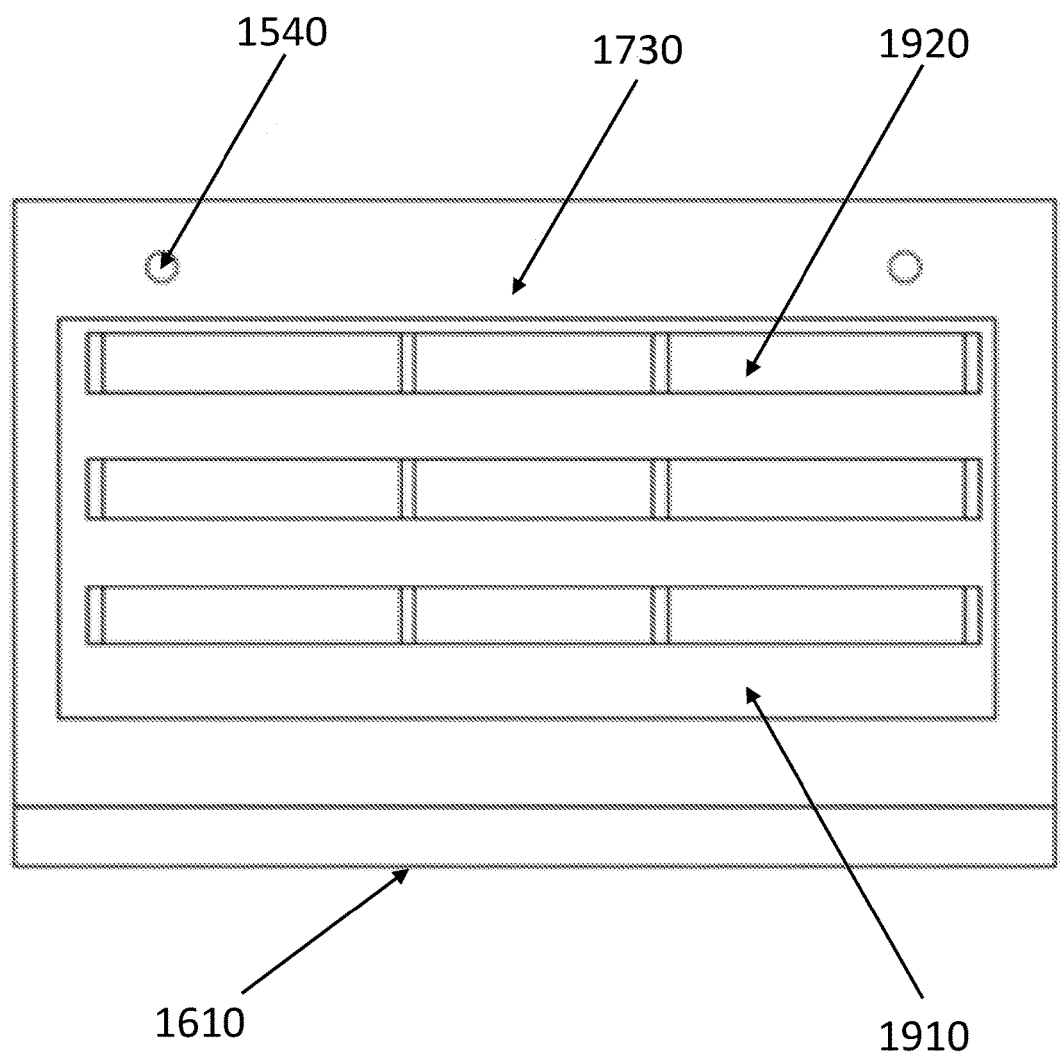
FIG. 19A illustrates a back view of an exemplary plug base according to some embodiments of the present disclosure.

FIG. 19A illustrates a back view of an exemplary plug base according to some embodiments of the present disclosure. As shown in FIG. 19A, the plug base 1730 has two holes 1540 and six rectangular windows 1920 formed on its surface. More particularly, one hole 1540 and three rectangular windows 1920 are formed on the left section of its surface and the remaining holes and windows are formed on the right section of the surface. Furthermore, an indented section 1910 as shown in FIG. 19A is formed on the surface of the connection plug 1530 and the six rectangular windows are formed inside the indented section 1910. In some embodiments, a cover, similar to the cover 1710 in FIG. 17 may be attached to the indented section 1910. More particularly, the cover is configured to fit into the indented section 1910.

Figure 19B:
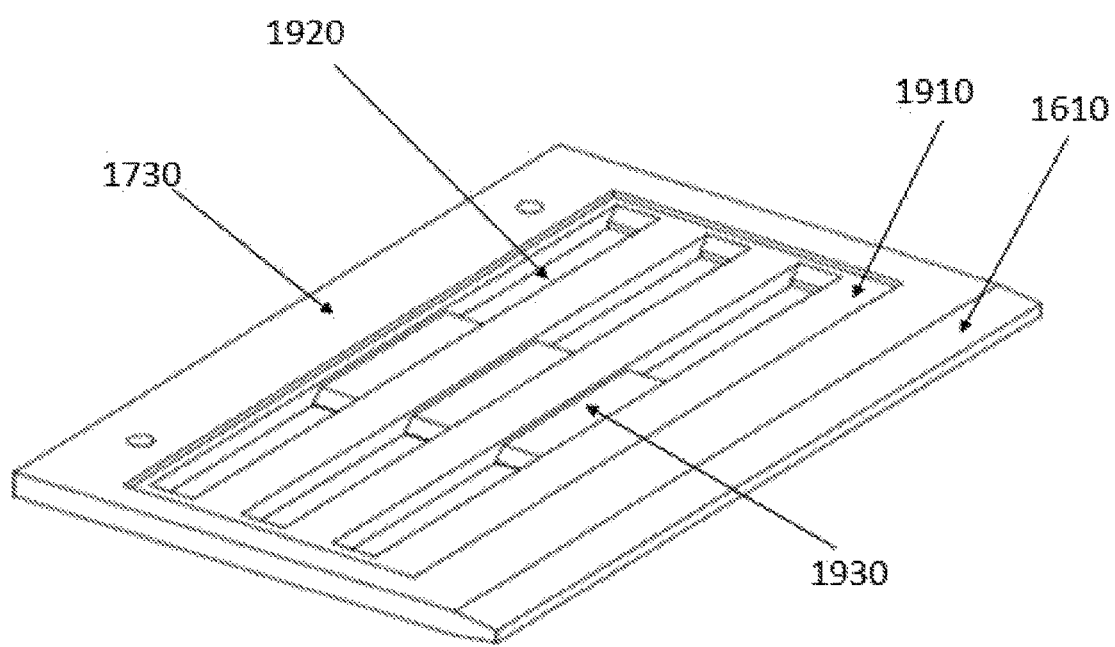
FIG. 19B illustrates a perspective view of an exemplary plug base according to some embodiments of the present disclosure.

FIG. 19B illustrates a perspective view of an exemplary plug base according to some embodiments of the present disclosure. As shown in FIG. 19B, the plug base has six rectangular windows for accepting conducting contacts of conducting strips. The plug base also has three solid sections 1930 in the middle to be attached to conducting components in the middle of the strips. More particularly, the conducting contacts are configured to fit into the rectangular windows 1920 and the size and shape of the conducting component in the middle of the strips are configured to match the size and shape of the solid sections 1930.

Figure 20A:
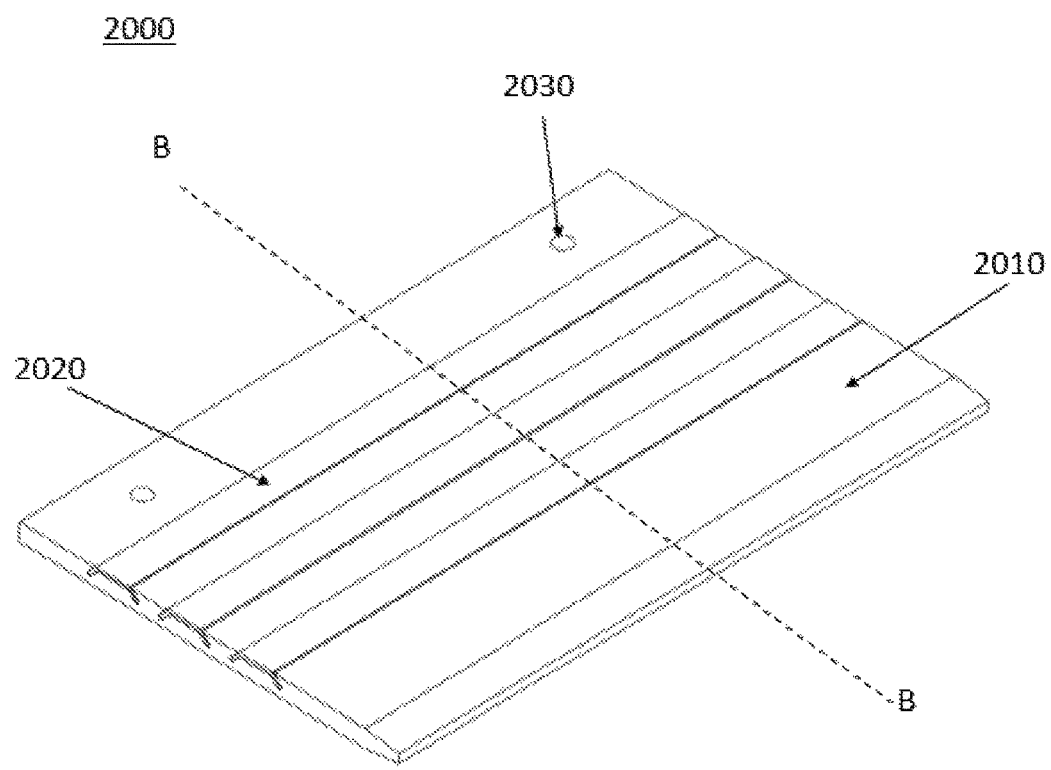
FIG. 20A illustrates a perspective view of an exemplary connection plug according to some embodiments of the present disclosure.

FIG. 20A illustrates a perspective view of an exemplary connection plug according to some embodiments of the present disclosure. As shown in FIG. 20A, the connection plug 2000 may include a plug base and a plurality of conducting bars placed on it. The connection plug 2000 has two holes 2030 formed on its front surface for receiving fixation pins so that it may be attached to two electrical power transmission and outlet devices. Furthermore, a plurality of conducting bars may be configured on the front surface or the back surface of the connection plug. For example, three conducting bars 2020 are placed on the front surface of the connection plug 2000. In some embodiments, the connection plug 2000 as shown in the FIG. 20A is divided by a line BB into a left section and a right section and each section is connected to an electrical power transmission and outlet device. More particularly, when the connection plug 2000 is inserted into the electrical power transmission and outlet devices, the conducting bars match the position of three concave slots of each electrical power transmission and outlet device to be electrically connected to the conductors placed in the concave slots.

In some embodiments, the plug base 2010 of the connection plug 2000 is made of an insulating material such as plastic, rubber, glass, ceramic, etc. while the conducting bars 2020 are made of a conducting material such as metal, alloy etc.

Figure 20B:
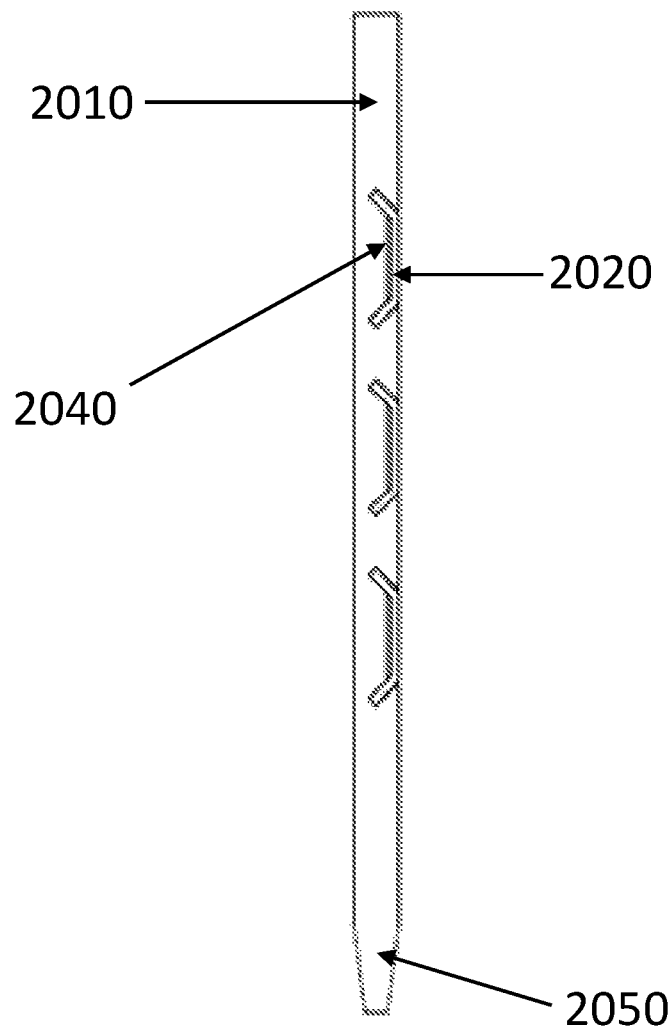
FIG. 20B illustrates a side view of an exemplary connection plug according to some embodiments of the present disclosure.

FIG. 20B illustrates a side view of an exemplary connection plug according to some embodiments of the present disclosure. In some embodiments, the bottom side 2050 of the connection plug 2000 is designed to be tapered so that the connection plug receives less resistance when it is inserted into the electrical power transmission and outlet device. Furthermore, small gaps 2040 are formed between the conducting bars and the plug base 2010 so that they provide enough space for the conducting bars to be deformed during the insertion.

Figure 21A:
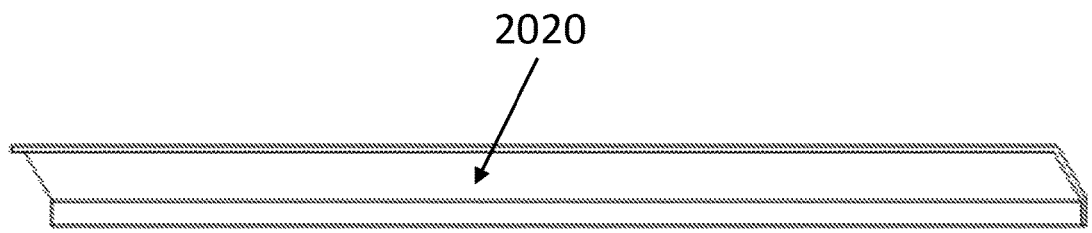
FIG. 21A illustrates a perspective view of an exemplary conducting bar according to some embodiments of the present disclosure.

FIG. 21A illustrates a perspective view of an exemplary conducting bar according to some embodiments of the present disclosure. Similar to the embodiments shown in FIG. 20A, when the connection plug is inserted to electrical power transmission and outlet devices, one end of the conducting bar 2020 is connected to a conductor in an concave slot of an electrical power transmission and outlet device and the other end is connected to another conductor in another concave slot of the other electrical power transmission and outlet device. Hence, the corresponding conductors of two devices are electrically connected to each other by the conducing bar 2020. More particularly, three conducting bars help all three conductors in one device to be connected to the corresponding three conductors in the other device.

Figure 21B:
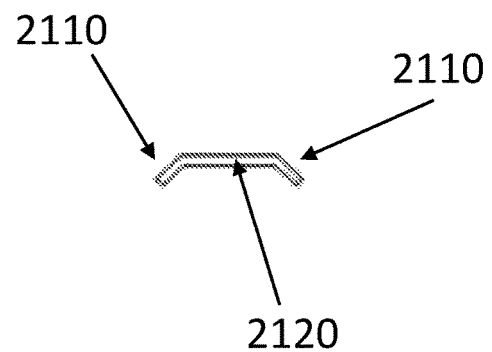
FIG. 21B illustrates a side view of an exemplary conducting bar according to some embodiments of the present disclosure.

FIG. 21B illustrates a side view of an exemplary conducting bar according to some embodiments of the present disclosure. As shown in FIG. 21B, the conducting bar has a center surface 2120 and two side surface 2110 configured in an n-shape. The angle between the center surface 2120 and each side surface 2110 can be any value from 0 to 180 degrees. For example, the angle between the center surface 2120 and the side surface 2110 is roughly 120 degrees. In some embodiments, the conducting bar is configured to fit into a plug base.

Figure 22A:
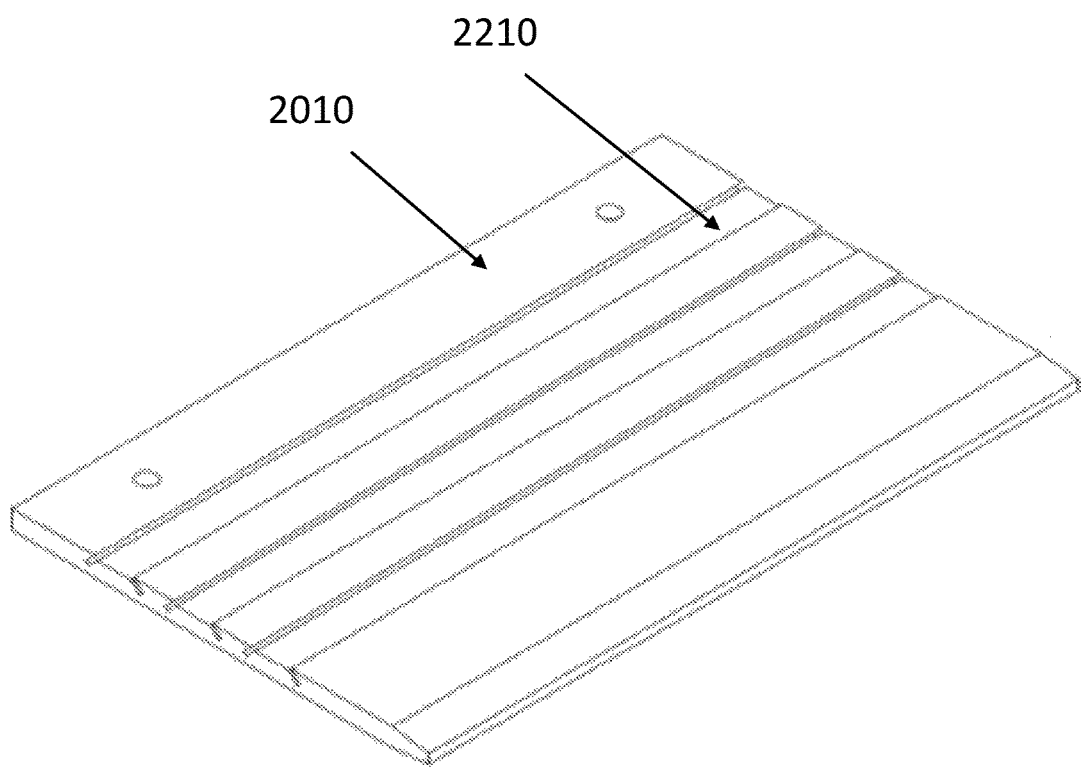
FIG. 22A illustrates a perspective view of an exemplary plug base according to some embodiments of the present disclosure.

FIG. 22A illustrates a perspective view of an exemplary plug base according to some embodiments of the present disclosure. As shown in FIG. 22A, the plug base 2010 has two holes 2030 formed on its front surface for receiving fixation pins so that it may be attached to two electrical power transmission and outlet devices. The plug base 2010 also has three cut-out sections 2210 formed on its surface for installing conducting bars.

Figure 22B:
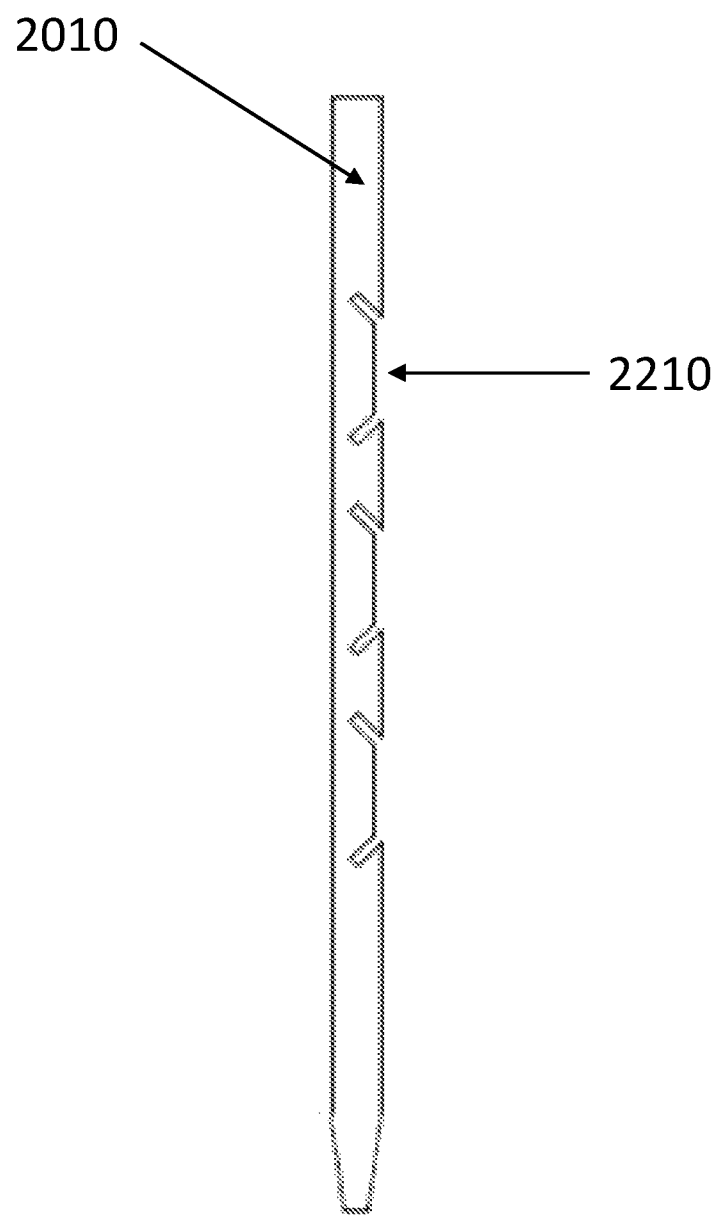
FIG. 22B illustrates a side view of an exemplary plug base according to some embodiments of the present disclosure.

FIG. 22B illustrates a side view of an exemplary plug base according to some embodiments of the present disclosure. In some embodiments, three cut-out sections 2210 are formed on a surface of the plug base 2010 for installing the conducting bars. More particularly, the size and shape of the cut-out sections 2210 are configured to match the size and shape of the conducting bars. As shown in 22B, the width of the conducting bars is greater than the opening of the cut-out sections 2210. The conducting bar is therefore hard to be inserted in or pulled out from the front surface of the plug base. Alternatively, the conducting bar can be slided into and out of the plug base from a side of the plug base.

Figure 23:
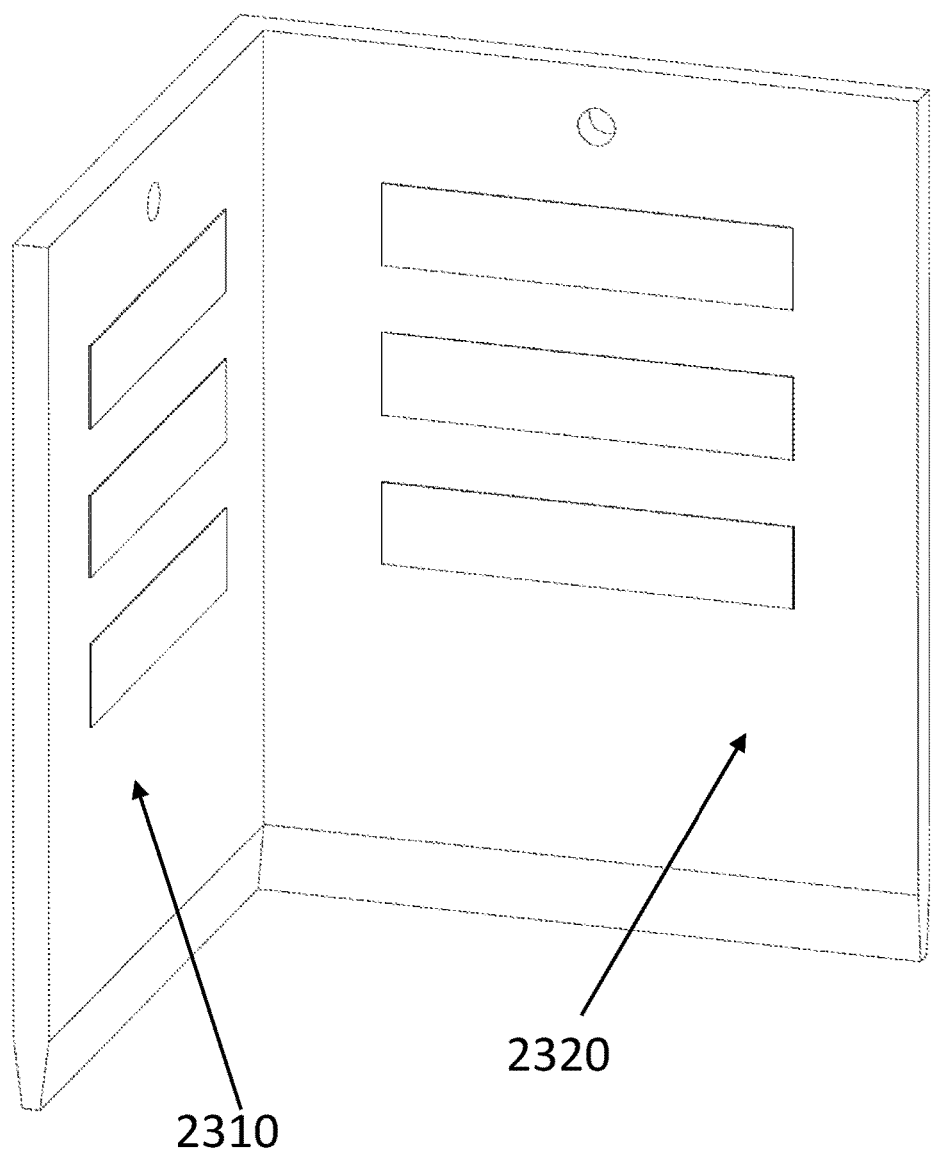
FIG. 23 illustrates an exemplary connection plug according to some embodiments of the present disclosure.

FIG. 23 illustrates an exemplary connection plug according to some embodiments of the present disclosure. As shown in FIG. 23, the L-shaped connection plug 2300 has two sections 2310 and 2320. The section 2310 and the section 2320 are perpendicularly attached to each other along an edge. In some embodiments, the L-shaped connection plug 2300 is used to connect two perpendicular electrical power transmission and outlet devices at a corner. For example, the section 2310 is inserted in and connected to one device and the section 2320 is inserted in and connected to the other device. Similar to the embodiments shown in FIG. 15, the section 2310 and section 2320 each has three conducting contacts placed on the front surface and each of the three conducting contacts in the section 2310 is electrically connected to a corresponding conducting contact of the three conducting contacts in the section 2320. Hence, the devices in which the section 2310 and 2320 are inserted, are electrically connected.

Figure 24:
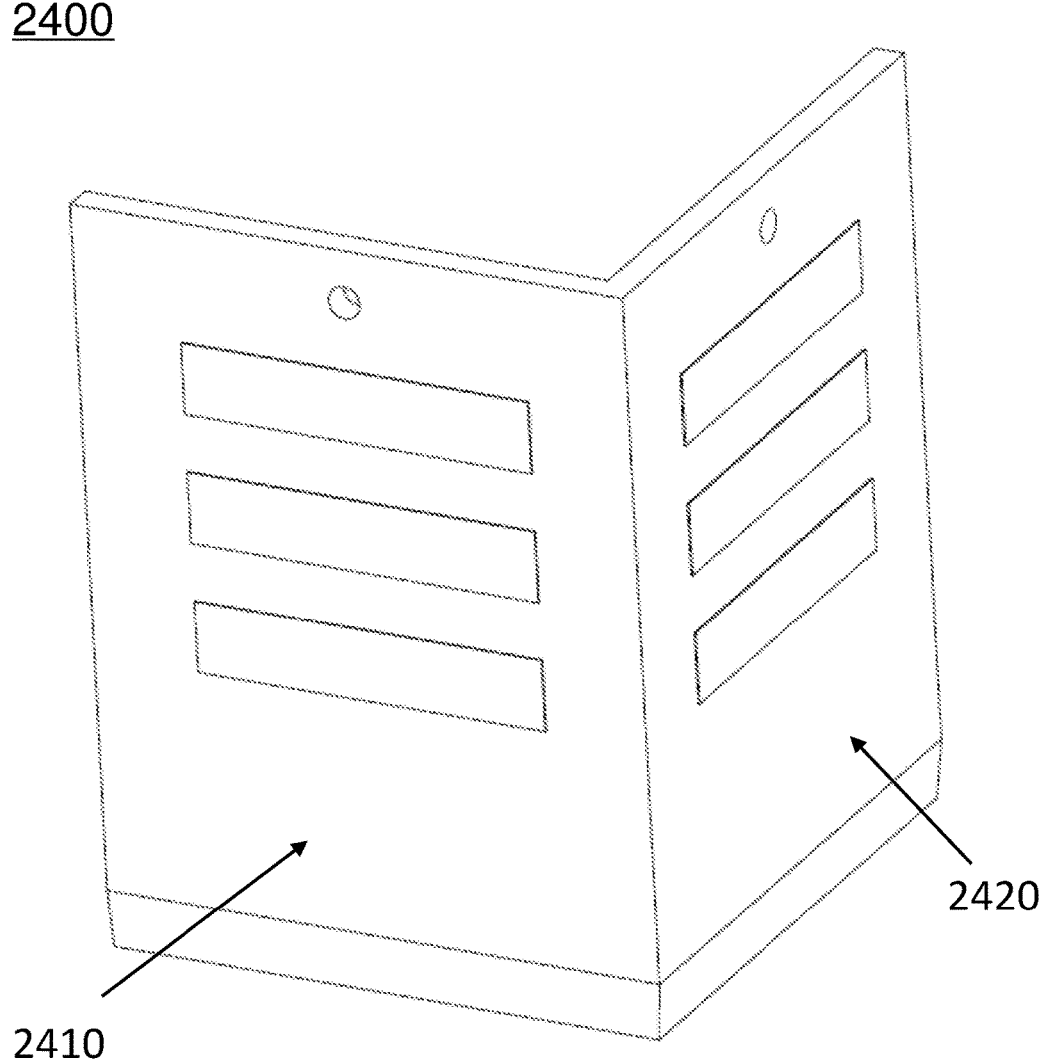
FIG. 24 illustrates an exemplary connection plug according to some embodiments of the present disclosure.

FIG. 24 illustrates an exemplary connection plug according to some embodiments of the present disclosure. As shown in FIG. 24, the L-shaped connection plug 2400 has two sections 2410 and 2420. The section 2410 and the section 2420 are perpendicularly attached to each other along an edge. In some embodiments, the L-shaped connection plug 2400 is used to connect two perpendicular electrical power transmission and outlet devices at a protruding edge. For example, the section 2410 is inserted in and connected to one device and the section 2420 is inserted in and connected to the other device. Similar to the embodiments shown in FIG. 23, the section 2410 and section 2420 each has three conducting contacts placed on the front surface and each of the three conducting contacts in the section 2410 is electrically connected to a corresponding conducting contact of the three conducting contacts in the section 2420. Hence, the devices in which the section 2410 and 2420 are inserted, are electrically connected.

Figure 25:
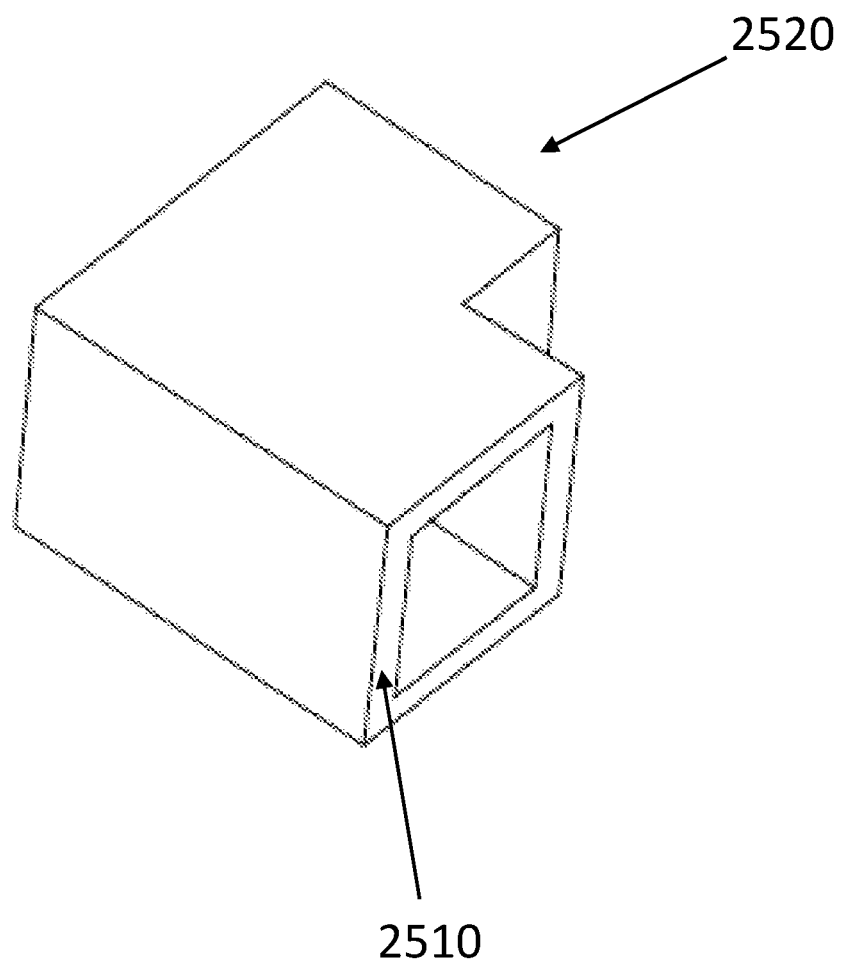
FIG. 25 illustrates an exemplary connection brick according to some embodiments of the present disclosure.

FIG. 25 illustrates an exemplary connection brick according to some embodiments of the present disclosure. As shown in FIG. 25, the L-shaped connection brick 2500 has two ends 2510 and 2520. The L-shaped connection brick 2500 may be used together with the connection plug 2300 in FIG. 23 or the connection plug 2400 in FIG. 24. In some embodiments, the ends 2510 and 2520 are each connected to an electrical power transmission and outlet device. For example, the electrical power transmission and outlet devices each includes a plurality of chambers for channeling and storing wires (e.g., electricity transmission wires, data transmission wires) and/or holding a power storage unit and the end 2510 and end 2520 are configured to fit into a chamber of each electrical power transmission and outlet devices 1520 for channeling and storing wires between two devices. Furthermore, the connection brick 2500 may be hollow so that the wires stored in one device can pass through the connection brick 2500 to the other device.

Figure 26:
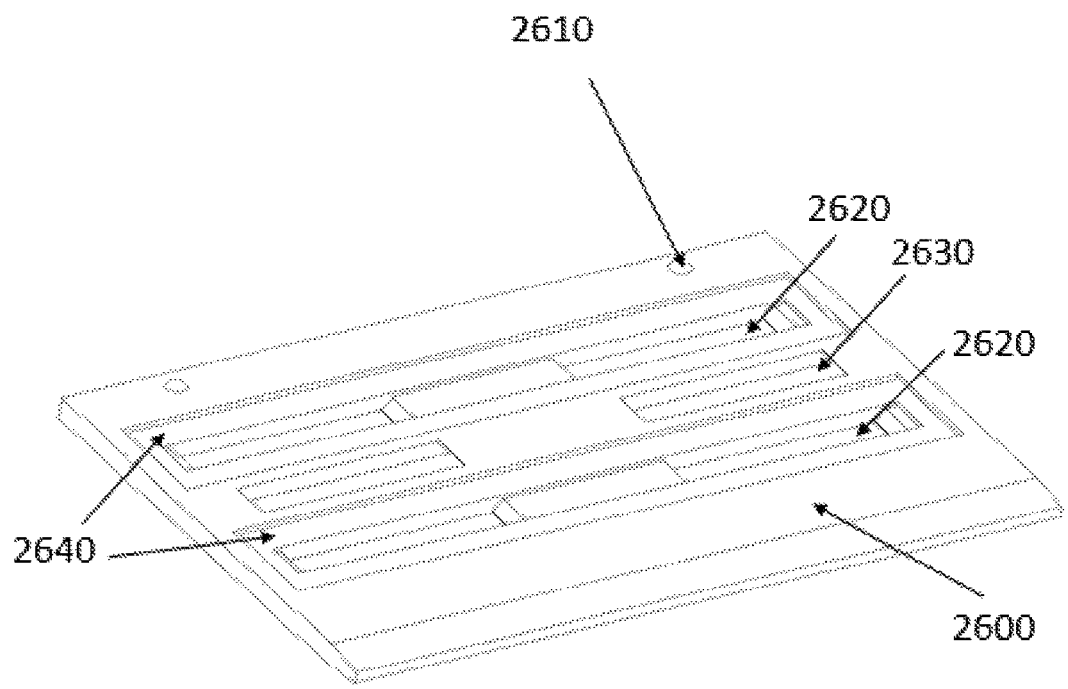
FIG. 26 illustrates a back surface of an exemplary plug base according to some embodiments of the present disclosure.

FIG. 26 illustrates a back surface of an exemplary plug base according to some embodiments of the present disclosure. Similar to the embodiments shown in FIG. 15, the plug base 2600 has two holes 2610 formed on its surface near the top side for receiving fixation pins so that it may be attached to two electrical power transmission and outlet devices. In some embodiments, the plug base 2600 may have a plurality of rectangular windows formed on its surface for placing conducting contacts. Some windows may be big and other windows may be small. For example, six rectangular windows are formed on the surface of the plug base 2600. More particularly, four big windows 2620 are formed on the top and bottom side of the plug base 2600 and two small windows 2630 are formed in the middle of the plug base 2600. Furthermore, a plurality of indented sections may be formed on the front and the back surface of the plug base 2600 for receiving a plurality of covers. Merely by way of example, two indented sections 2640 are formed on the surface of the plug base 2600 and one indented section is formed on another surface of the plug base 2600 (not shown in the figure).

Figure 27:
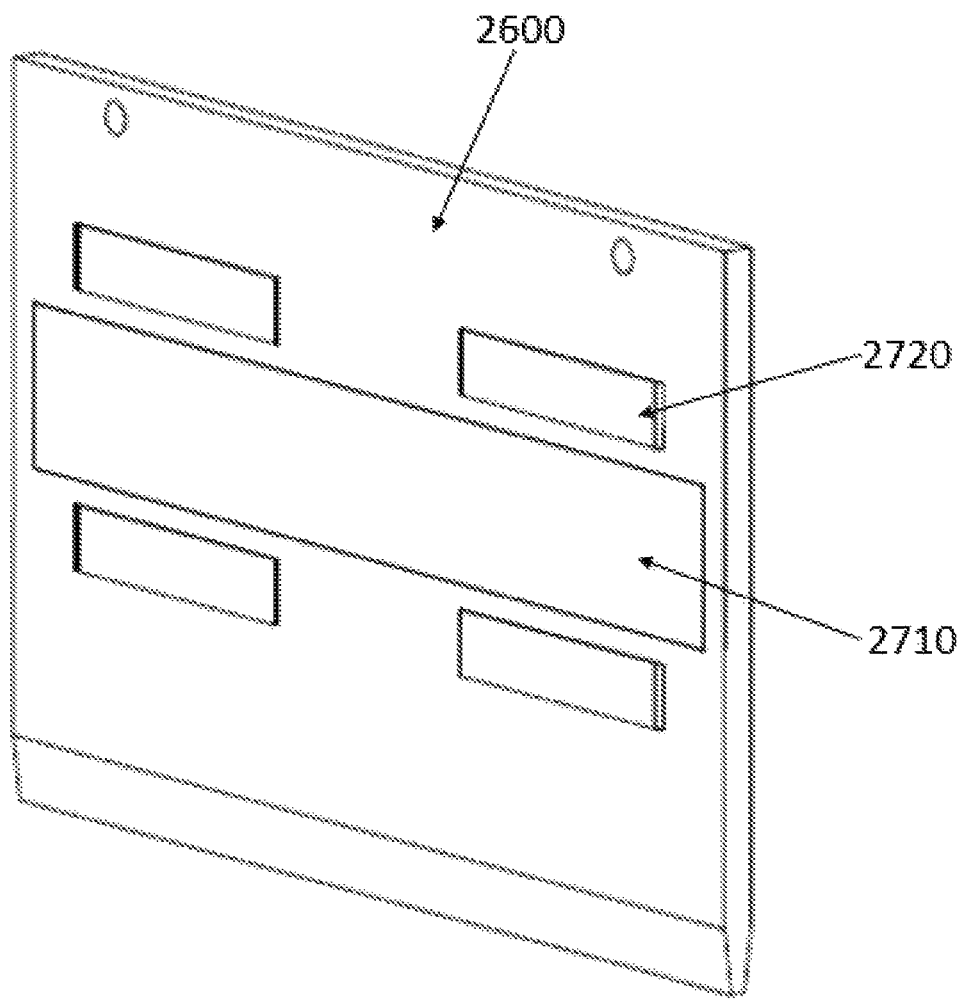
FIG. 27 illustrates a front surface of an exemplary connection plug according to some embodiments of the present disclosure.

FIG. 27 illustrates a front surface of an exemplary connection plug according to some embodiments of the present disclosure. As shown in FIG. 27, the connection plug has four big conducting contacts installed in the windows on the top and bottom side of the front surface and a cover 2710 is installed in an indented section in the middle of the front surface. When the connection plug is inserted into two electrical power transmission and outlet devices as illustrated in FIG. 15, conducting contacts 2720 is electrically connected to top and bottom conductors stored in the concave slots of the each device. More particularly, the top conductors are electrically connected to a neutral wire and the bottom conductors are electrically connected to a hot wire. The cover in the middle is made of an insulating material such as plastic, rubber, glass, ceramic, etc. so that the ground wire which is connected to the conductors in the middle concave slot is not connected to the connection plug 2700.

Figure 28:
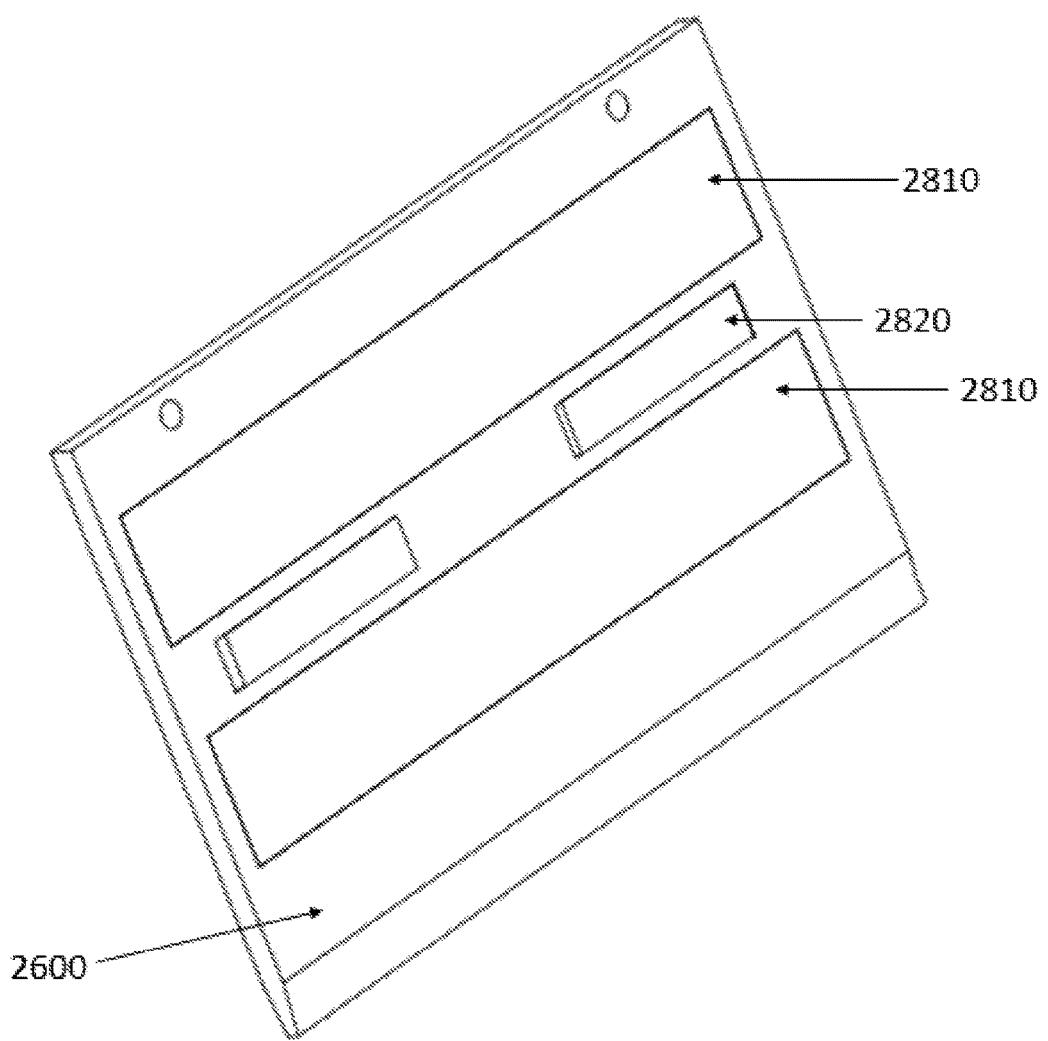
FIG. 28 illustrates a back surface of an exemplary connection plug according to some embodiments of the present disclosure.

FIG. 28 illustrates a back surface of an exemplary connection plug according to some embodiments of the present disclosure. As shown in FIG. 28, the connection plug has two small conducting contacts installed in the middle of the back surface of the connection plug 2700 and two covers 2810 are installed in two indented sections on the top and bottom side of the back surface. When the connection plug is inserted into two electrical power transmission and outlet devices as illustrated in FIG. 15, conducting contacts 2820 is not connected to the device. Alternatively, the conductors in the middle concave slot of the electrical power transmission and outlet devices can be moved to the side wall opposite to the concave slots on the top and bottom. More specifically, the conductors can be moved to match the position of the conducting contacts 2820 so that when the connection plug is inserted into the devices, the conducting contacts 2820 of the connection plug is electrically connected to the conductors in the middle concave slot of the devices. Hence, the top and bottom conductors of the devices are electrically connected by the conducting contacts 2720 as shown in the embodiments of FIG. 27 and the middle conductors of the devices are electrically connected by the conducting contacts 2820.

Figure 29:
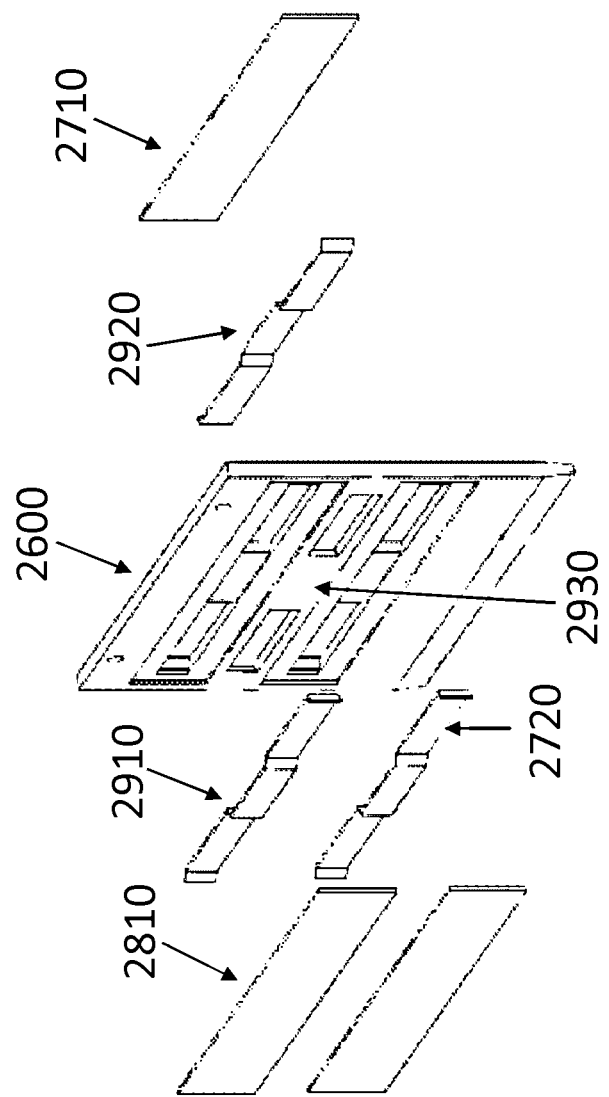
FIG. 29 illustrates an exploded view of an exemplary connection plug according to some embodiments of the present disclosure.

FIG. 29 illustrates an exploded view of an exemplary connection plug according to some embodiments of the present disclosure. As shown in FIG. 29, the connection plug 2900 may include a plug base 2600, three conducting strips and three covers. The plug base 2600 has six rectangular windows for placing the conducting contacts 2720 of the conducting strips. Two conducting strips 2910 as shown in FIG. 29 are attached to a surface of the plug base 2600 and one conducting strip 2920 is connected to another surface of the plug base 2600. In some embodiments, the conducting strip has two conducting contacts formed on the sides connected by a conducting component in the middle. When the conducting strips are attached to a surface of the plug base 2600, the conducting contacts of the conducting strips are exposed on the opposite surface of the connection plug. The conducting component instead is attached to a solid section 2930 of the plug base and are not exposed on the surface of the connection plug. Furthermore, the conducting strips 2910 and 2920 are connected to the covers 2810 and 2710 respectively and the covers 2810 and 2710 are configured to fit into the indented sections in the plug base 2600.

It should be noted that this description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. It should be appreciated for those skilled in the art that an integral structure may be broken down into a plurality of sections to realize a similar function and sections, unless said to be detachably connected to each other, may be an integral structure.

What is claimed is:

1. An electrical power transmission and outlet device, comprising
   a housing comprising an opening;
   a plurality of concave slots formed inside the housing;
   a plurality of electrical conductors placed in at least some of the plurality of concave slots; and
   a water-proof and dust-proof cover for sealing the opening comprises a rotation shaft,
      wherein when an external plug is inserted into the opening, the plurality of conductors in the slots are electrically connected to the external plug and the rotation shaft rotates downwards, and when the external plug is pulled out, the rotation shaft restores.

2. The electrical power transmission and outlet device of claim 1, wherein the cover is made of an elastic material which bends downwards when the external plug is inserted into the opening and restores when the external plug is pulled out.

3. The electrical power transmission and outlet device of claim 1, further comprising a drainage unit.

4. The electrical power transmission and outlet device of claim 3, wherein the drainage unit is a guiding gutter.

5. The electrical power transmission and outlet device of claim 1, wherein an outer side of the housing is configured to be mounted to a surface.

6. The electrical power transmission and outlet device of claim 5, wherein the surface is a wall, a ceiling, a floor or a table.

7. The electrical power transmission and outlet device of claim 1, further comprising a plurality of elastic embossments placed inside the housing and opposite to the plurality of electrical conductors.

8. An electrical power transmission and outlet device, comprising
   a housing having an opening for receiving an external plug;
   a connector in the housing for connecting with an external device;
   a plurality of electrical conductors in the housing connected to the connector; and
   a water-proof and dust-proof cover for sealing the opening,
      wherein when an external plug is inserted into the opening, the plurality of electrical conductors are electrically connected to the external plug and disconnected from the connector, and when the external plug is pulled out of the opening, the plurality of electrical conductors are electrically disconnected from the external plug and reconnected to the connector, and
      wherein the cover comprises a rotation shaft which rotates downwards when the external plug is inserted into the opening and restores when the external plug is pulled out.

9. The electrical power transmission and outlet device of claim 8 further comprising an elastic component installed inside the housing, wherein when the external plug is inserted into the opening, the connector is displaced from an original position and when the external plug is pulled out of the opening, the elastic component moves the connector back to the original position.

10. The electrical power transmission and outlet device of claim 9, wherein the elastic component is a spring.

11. The electrical power transmission and outlet device of claim 8, wherein the external plug can be inserted at a plurality of locations of the opening.

12. The electrical power transmission and outlet device of claim 8, wherein two of the plurality of electrical conductors is electrically connected to a hot wire, and a neutral wire, respectively.

13. An electrical power transmission and outlet system, comprising:
   an external power storage unit; and
   an electrical power transmission and outlet device, comprising
      a housing having an opening for receiving an external plug;
      a connector in the housing for connecting with the external power storage unit;
      a plurality of electrical conductors in the housing connected to the connector; and
      a water-proof and dust-proof cover for sealing the opening,
         wherein when an external plug is inserted into the opening, the plurality of electrical conductors are electrically connected to the external plug and disconnected from the connector, and when the external plug is pulled out of the opening, the plurality of electrical conductors are electrically disconnected from the external plug and reconnected to the connector, and
         wherein the cover comprises a rotation shaft which rotates downwards when the external plug is inserted into the opening and restores when the external plug is pulled out.

14. The electrical power transmission and outlet system of claim 13, wherein the external power storage unit is a battery, a power source, a capacitor, or a power adaptor.

15. The electrical power transmission and outlet system of claim 13, wherein the external power storage unit is connected to a power generator.

16. The electrical power transmission and outlet system of claim 15, wherein the power generator is a solar panel or a wind turbine.

17. The electrical power transmission and outlet system of claim 15, wherein the external power storage unit supplies electricity to the electrical conductors when the external plug is pulled out of the opening.

18. The electrical power transmission and outlet system of claim 13, wherein the external power storage unit is placed inside the housing.

* * * * *